United States Patent
Park et al.

(10) Patent No.: US 11,968,652 B2
(45) Date of Patent: Apr. 23, 2024

(54) SIGNAL TRANSMISSION USING PLURALITY OF APs

(71) Applicant: LG ELECTRONICS INC., Seoul (KR)

(72) Inventors: Sungjin Park, Seoul (KR); Kiseon Ryu, Seoul (KR); Jeongki Kim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 446 days.

(21) Appl. No.: 17/310,395

(22) PCT Filed: Jan. 20, 2020

(86) PCT No.: PCT/KR2020/000943
§ 371 (c)(1),
(2) Date: Jul. 30, 2021

(87) PCT Pub. No.: WO2020/180007
PCT Pub. Date: Sep. 10, 2020

(65) Prior Publication Data
US 2022/0116918 A1      Apr. 14, 2022

Related U.S. Application Data
(60) Provisional application No. 62/816,927, filed on Mar. 12, 2019, provisional application No. 62/815,287, filed on Mar. 7, 2019.

(51) Int. Cl.
*H04W 84/12*      (2009.01)
*H04W 72/04*      (2023.01)

(52) U.S. Cl.
CPC ............ *H04W 72/04* (2013.01); *H04W 84/12* (2013.01)

(58) Field of Classification Search
CPC .................................................... H04W 84/12
USPC ............................................................ 370/338
See application file for complete search history.

(56) References Cited

U.S. PATENT DOCUMENTS
2016/0330007 A1      11/2016   Cherian et al.

FOREIGN PATENT DOCUMENTS
| KR | 20150005655 | 1/2015 |
| WO | 2016167438 | 10/2016 |
| WO | 2017142210 | 8/2017 |

OTHER PUBLICATIONS
PCT International Application No. PCT/KR2020/000943, International Search Report dated May 6, 2020, 5 pages.
Ryu, et al., "Consideration on multi-AP coordination for EHT," IEEE 802.11-18/1982r1, Jan. 2019, 12 pages.

*Primary Examiner* — Angel T Brockman
(74) *Attorney, Agent, or Firm* — LEE, HONG, DEGERMAN, KANG & WAIMEY

(57) ABSTRACT

In a wireless local area network system including a plurality of types of access points (APs), a first type AP receives a trigger frame from a second type AP, wherein the trigger frame may include first information related to resource allocation for a first block acknowledgment (BA) frame transmitted by a station (STA) to the first type AP. The first type AP may transmit, to the STA, a physical protocol data unit (PPDU) including data for the STA and the first information. The first type AP may receive, from the STA, the first BA frame on the basis of the first information.

14 Claims, 35 Drawing Sheets

PPDU Format (IEEE 802.11a/g)

| L-LTF | L-STF | L-SIG | Data |

HT PPDU Format (IEEE 802.11n)

| L-LTF | L-STF | L-SIG | SIG A | HT-SFT | HT-LFT | ... | HT-LFT | Data |

VHT PPDU Format (IEEE 802.11ac)

| L-LTF | L-STF | L-SIG | VHT-SIG A | VHT-SFT | VHT-LFT | VHT-SIG B | Data |

| 8µs | 8µs | 4µs | 4µs | 8µs | 4µs per symbol | | | | | |
|---|---|---|---|---|---|---|---|---|---|---|
| L-LTF | L-STF | L-SIG | RL-SIG | HE-SIG A | HE-SIG B | HE-STF | HE-LTF | ... | HE-LTF | Data | PE |

4µs per symbol · Variable durations per HE-LTF symbol

FIG. 18

| 8μs | 8μs | 4μs | 4μs | | | | | |
|---|---|---|---|---|---|---|---|---|
| L-LTF | L-STF | L-SIG | RL-SIG | SIG A | SIG B | STF | LTF | Data | PE |

SIGNAL TRANSMISSION USING PLURALITY OF APs

CROSS-REFERENCE TO RELATED APPLICATIONS

This application is the National Stage filing under 35 U.S.C. 371 of International Application No. PCT/KR2020/000943, filed on Jan. 20, 2020, which claims the benefit of U.S. Provisional Application Nos. 62/815,287, filed on Mar. 7, 2019, and 62/816,927, filed on Mar. 12, 2019, the contents of which are all hereby incorporated by reference herein in their entireties.

BACKGROUND

Technical Field

The present specification relates to a procedure for signal transmission in a wireless local area network (WLAN) system including a plurality of access points (APs).

Related Art

A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

In a method performed by a first type AP in a wireless local area network (WLAN) system including a plurality of types of access points (APs) according to various embodiments, the first type AP allocates resources for a BA (block acknowledgment) frame transmission. For example, the first type AP may receive a trigger frame from the second type AP, wherein the trigger frame may include first information related to resource allocation for a first block acknowledgment (BA) frame that a station (STA) transmits to the first type AP. The first type AP may transmit a physical protocol data unit (PPDU) including data for the STA and the first information to the STA. The first type AP may receive the first BA frame from the STA based on the first information.

According to an example according to the present specification, a Master AP (M-AP) may allocate a resource for receiving a block ACK(BA) from an STA to a Slave AP (S-AP). The S-AP may receive BAs from a plurality of STAs. The STA may transmit the BA to the S-AP through the allocated resource, thereby preventing collision between BA frames transmitted by a plurality of STAs. Therefore, a technical effect that enables efficient communication may occur.

BRIEF DESCRIPTION OF THE DRAWINGS

FIG. 4 illustrates an example of a PPDU used in an IEEE standard.

FIG. 18 illustrates an example of a PPDU used in the present specification.

DESCRIPTION OF EXEMPLARY EMBODIMENTS

Figure 1:
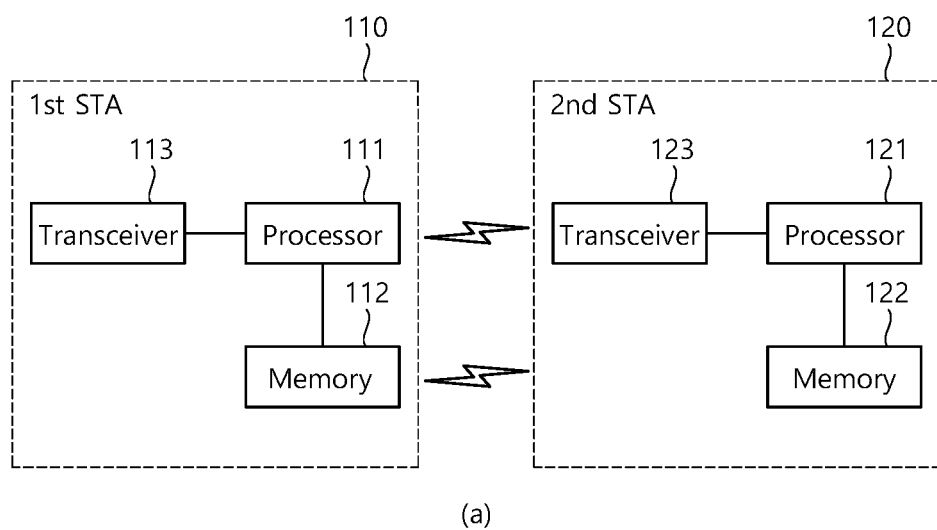
FIG. 1 shows an example of a transmitting apparatus and/or receiving apparatus of the present specification.
Figure 1:
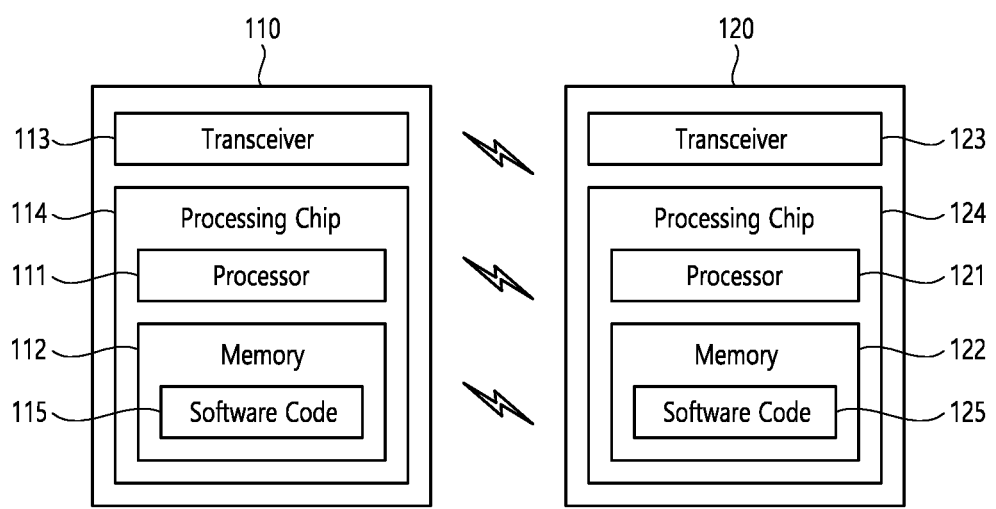

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP. In the STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
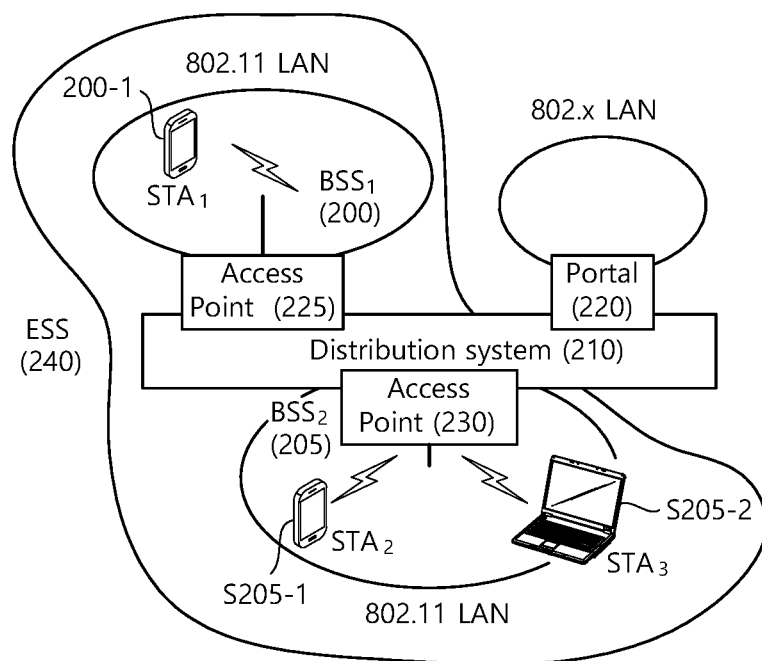
FIG. 2 is a conceptual view illustrating the structure of a wireless local area network (WLAN).
Figure 2:
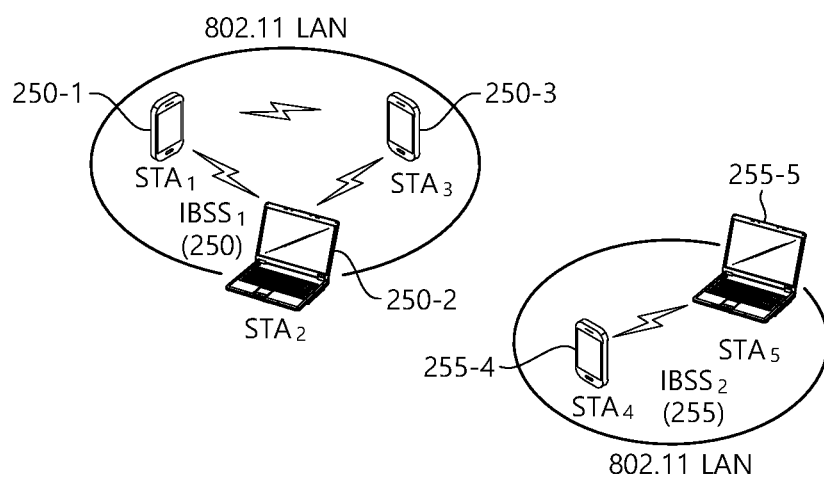

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
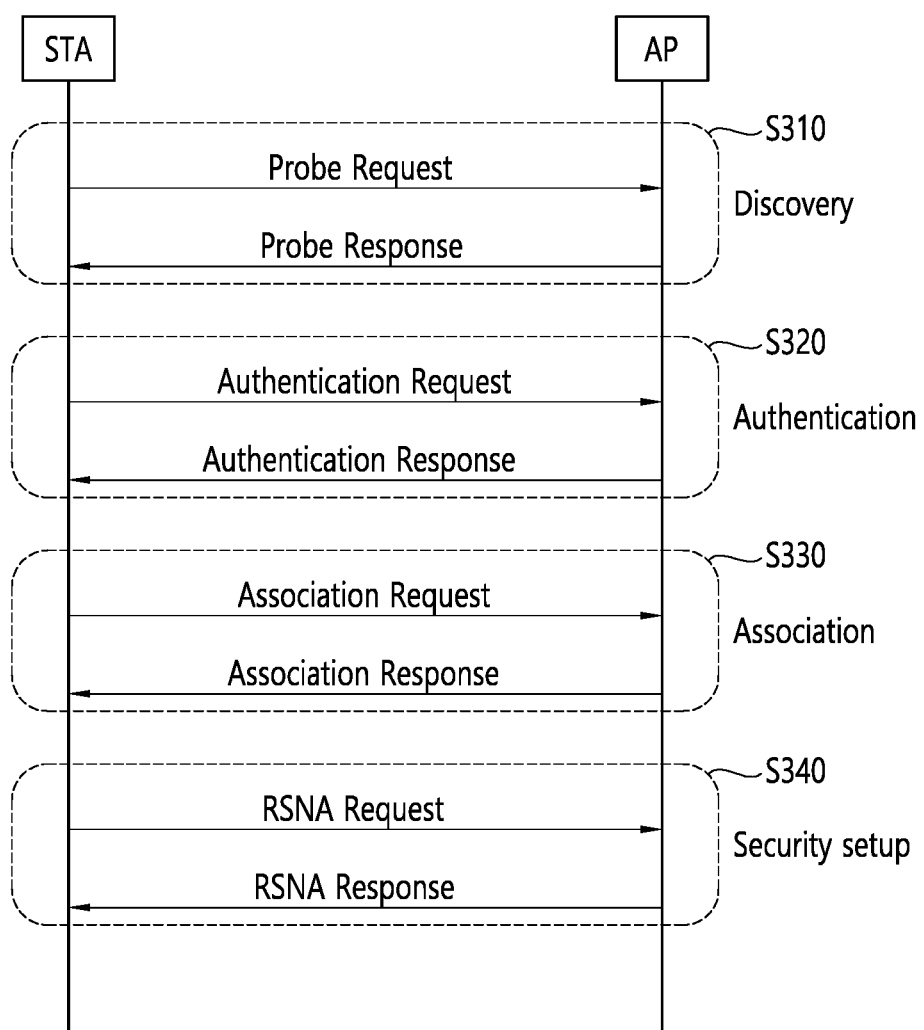
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
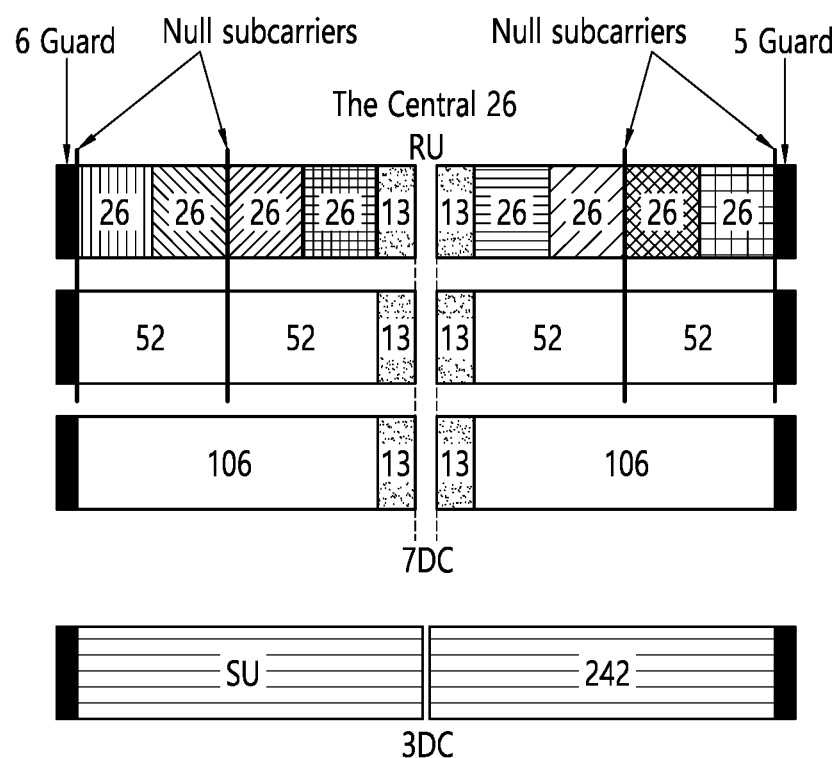
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
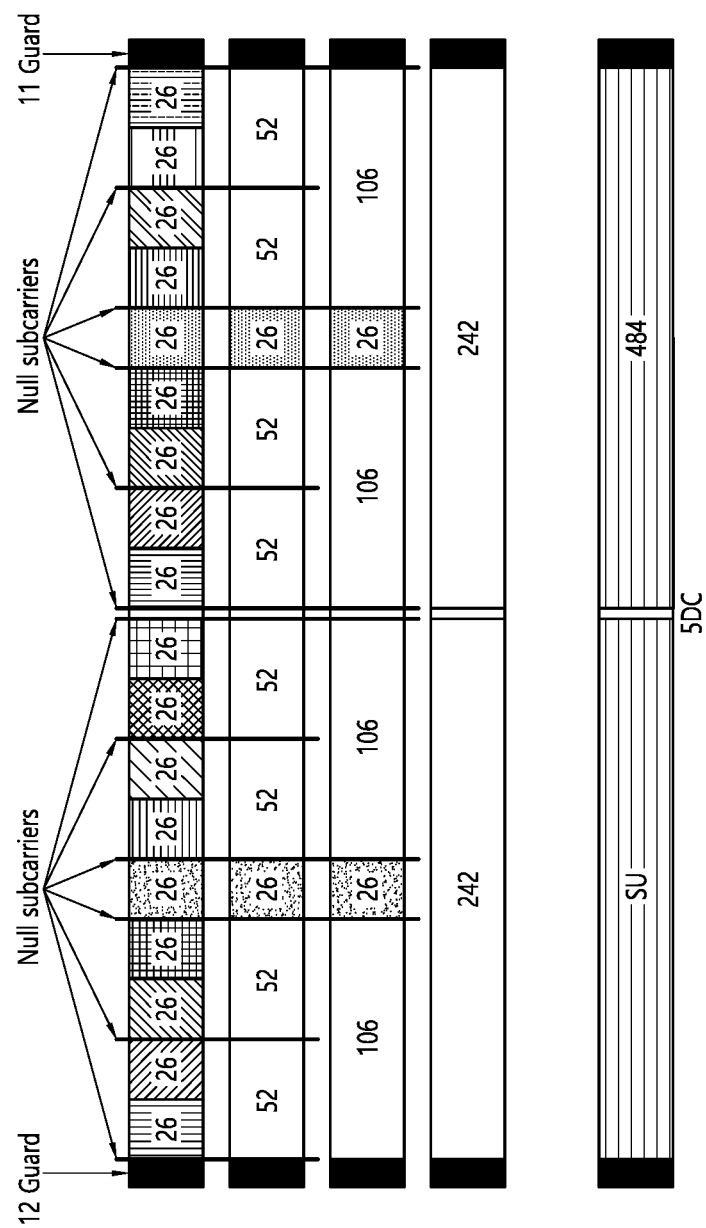
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
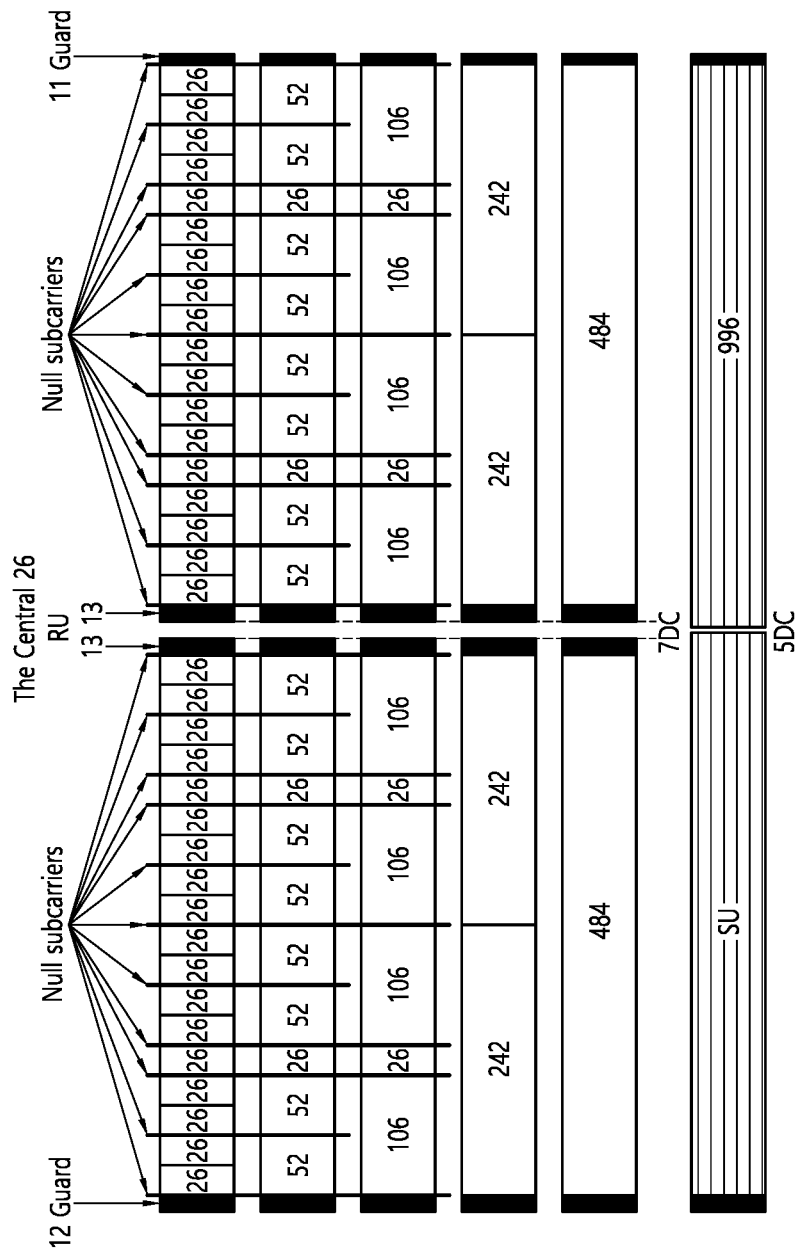
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

In the meantime, the fact that the specific number of RUs can be changed is the same as those of FIGS. 5 and 6.

The RU arrangement (i.e., RU location) shown in FIGS. 5 to 7 can be applied to a new wireless LAN system (e.g. EHT system) as it is. Meanwhile, for the 160 MHz band supported by the new WLAN system, the RU arrangement for 80 MHz (i.e., an example of FIG. 7) may be repeated twice, or the RU arrangement for the 40 MHz (i.e., an example of FIG. 6) may be repeated 4 times. In addition, when the EHT PPDU is configured for the 320 MHz band, the arrangement of the RU for 80 MHz (i.e., an example of FIG. 7) may be repeated 4 times or the arrangement of the RU for 40 MHz (i.e., an example of FIG. 6) may be repeated 8 times.

One RU of the present specification may be allocated for a single STA (e.g., a single non-AP STA). Alternatively, a plurality of RUs may be allocated for one STA (e.g., a non-AP STA).

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
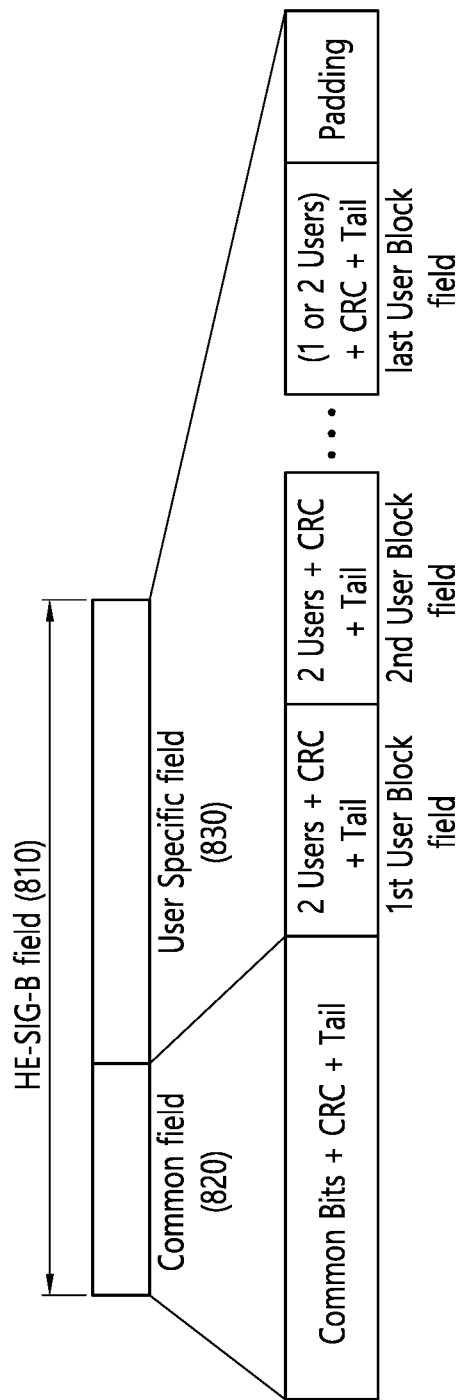
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | 106 | | | 26 | 26 | 26 | 26 | 26 | | 8 |
| 01001$y_2y_1y_0$ | 106 | | | 26 | 26 | 26 | 52 | | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
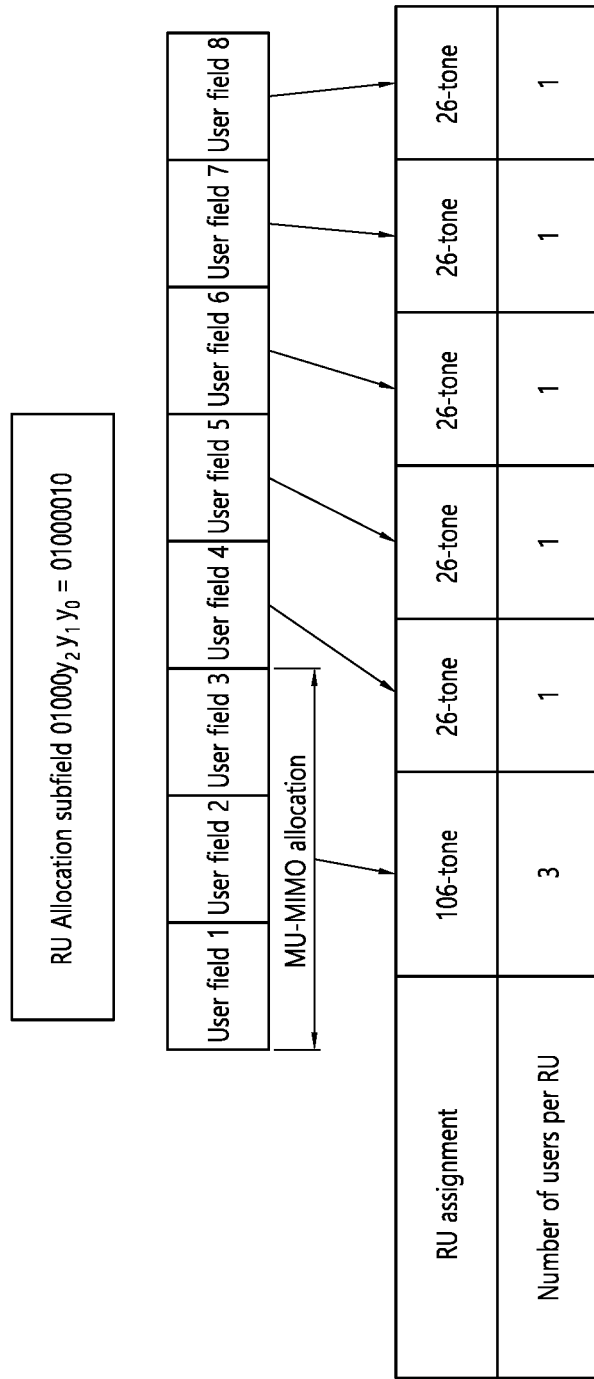
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.).

TABLE 3

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS[3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
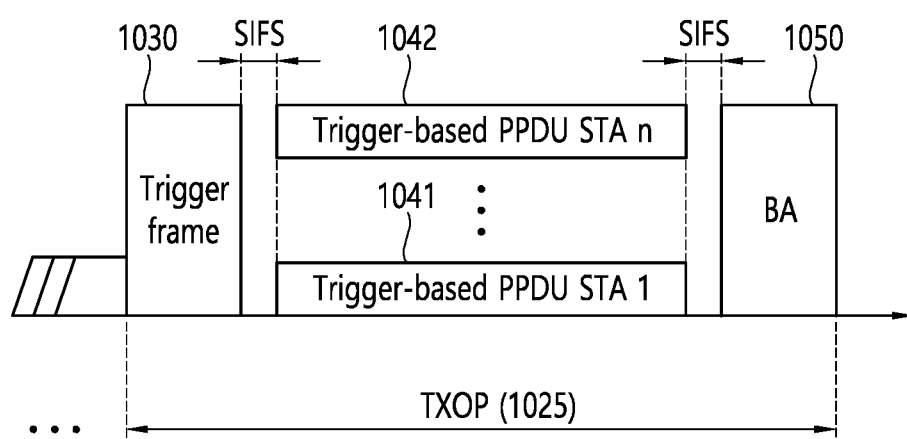
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
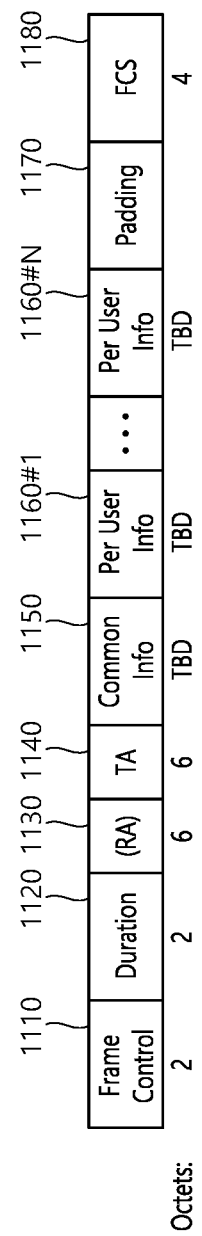
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common information, information related to a length of a CP of the uplink PPDU transmitted in response to the corresponding trigger frame or information related to a length of an LTF field may be included.

In addition, per user information fields 1160#1 to 1160#N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160#1 to 1160#N shown in FIG. 11 may include a plurality of subfields.

Figure 12:
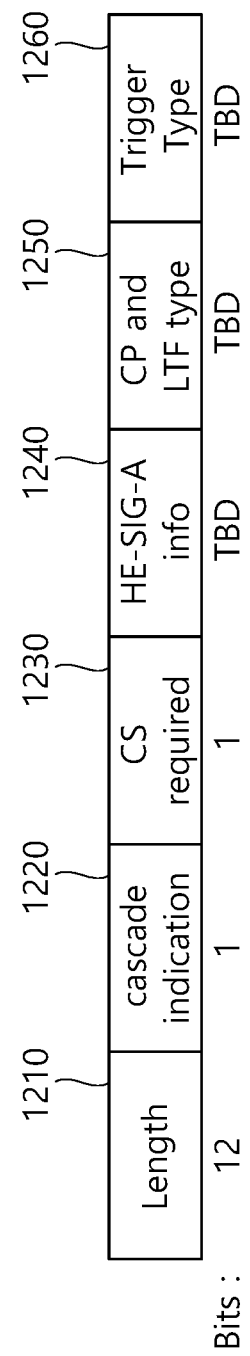
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
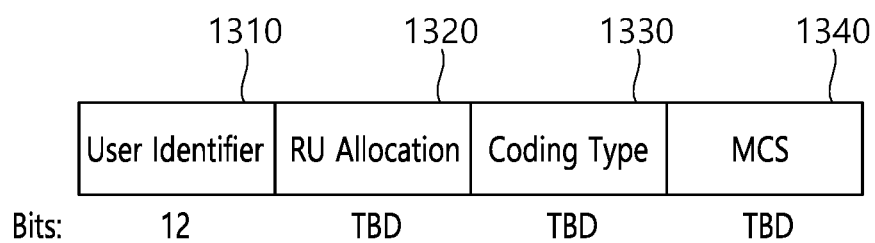
FIG. 13 illustrates an example of a subfield included in a per user information field.

FIG. 13 illustrates an example of a subfield included in a per user information field. A user information field 1300 of FIG. 13 may be understood as any one of the per user information fields 1160#1 to 1160#N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
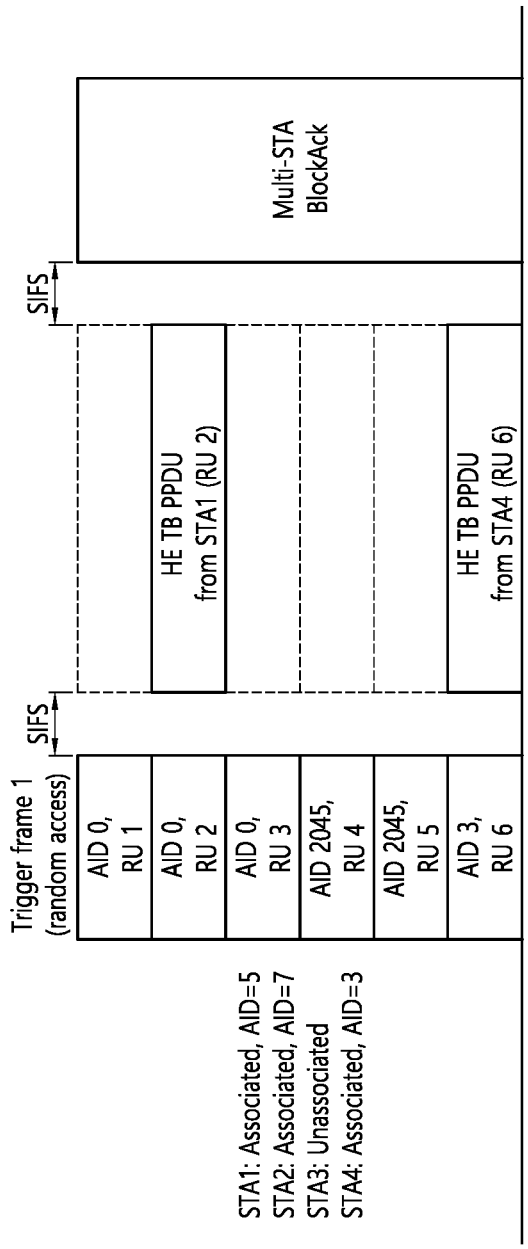
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
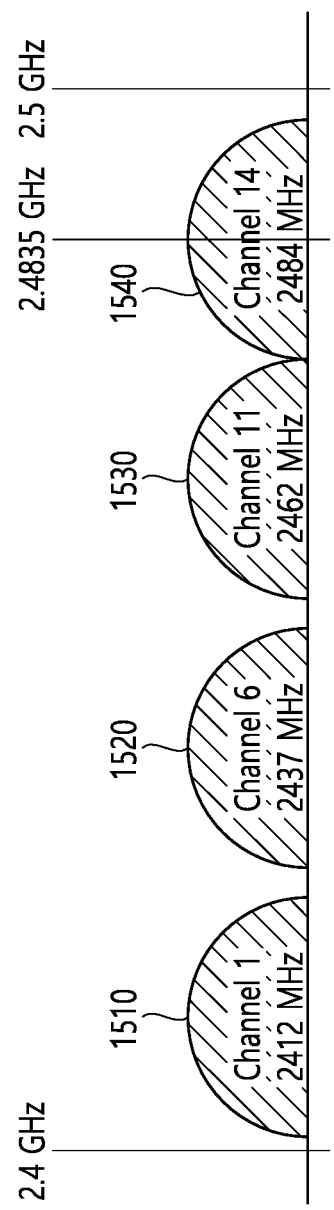
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
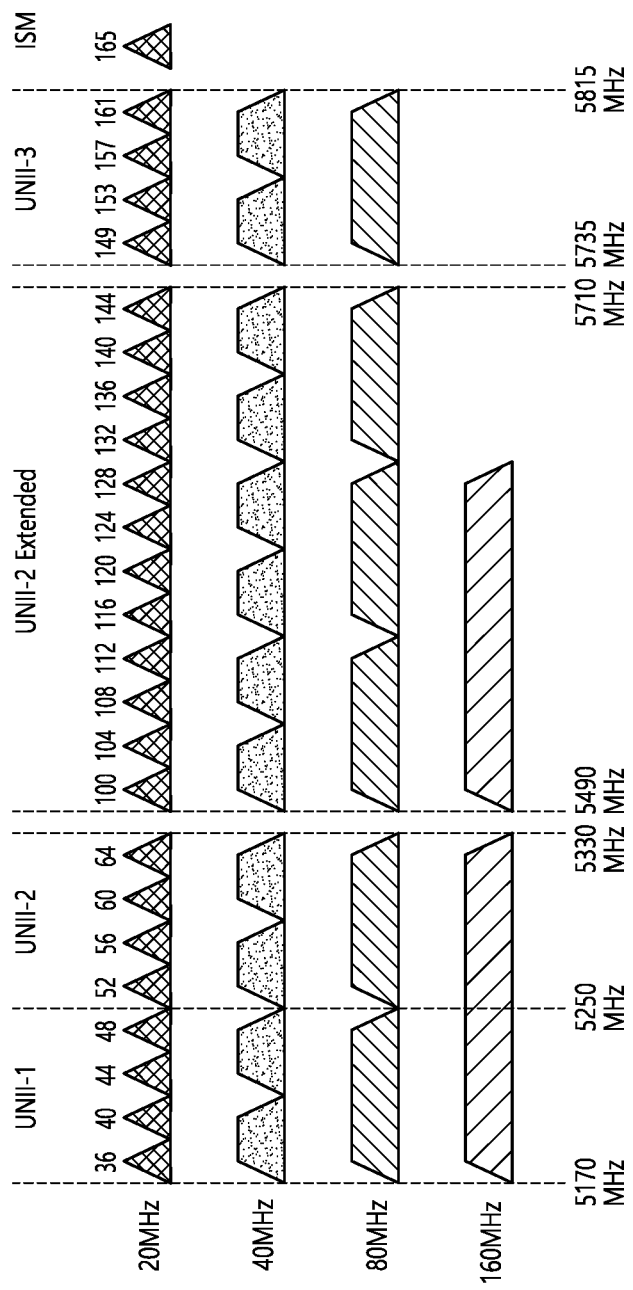
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNIT Low. The UNII-2 may include a frequency domain called UNIT Mid and UNIT-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
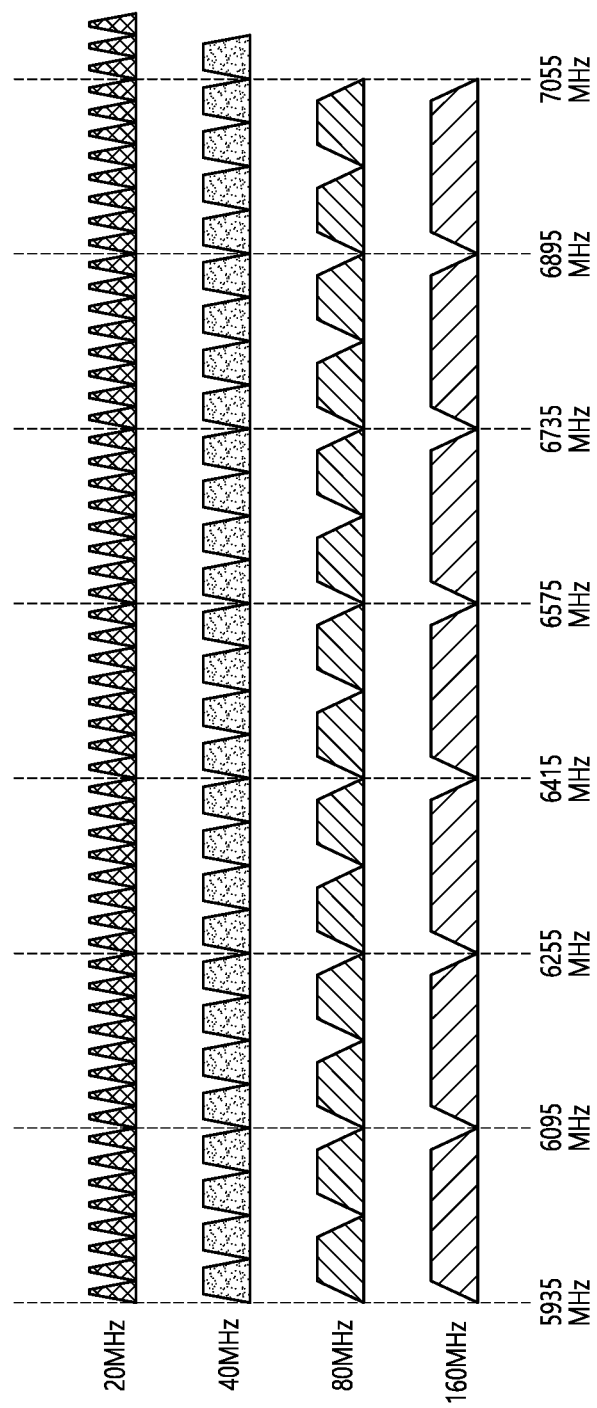
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

FIG. 18 illustrates an example of a PPDU used in the present specification.

The PPDU 1800 depicted in FIG. 18 may be referred to as various terms such as an EHT PPDU, a TX PPDU, an RX PPDU, a first type or N-th type PPDU, or the like. In addition, the EHT PPDU may be used in an EHT system and/or a new WLAN system enhanced from the EHT system.

The subfields 1801 to 1810 depicted in FIG. 18 may be referred to as various terms. For example, a SIG A field 1805 may be referred to an EHT-SIG-A field, a SIG B field 1806 may be referred to an EHT-SIG-B, a STF field 1807 may be referred to an EHT-STF field, and an LTF field 1808 may be referred to an EHT-LTF.

The subcarrier spacing of the L-LTF, L-STF, L-SIG, and RL-SIG fields 1801, 1802, 1803, and 1804 of FIG. 18 can be set to 312.5 kHz, and the subcarrier spacing of the STF, LTF, and Data fields 1807, 1808, and 1809 of FIG. 18 can be set to 78.125 kHz. That is, the subcarrier index of the L-LTF, L-STF, L-SIG, and RL-SIG fields 1801, 1802, 1803, and 1804 can be expressed in unit of 312.5 kHz, and the subcarrier index of the STF, LTF, and Data fields 1807, 1808, and 1809 can be expressed in unit of 78.125 kHz.

The SIG A and/or SIG B fields of FIG. 18 may include additional fields (e.g., a SIG C field or one control symbol, etc.). The subcarrier spacing of all or part of the SIG A and SIG B fields may be set to 312.5 kHz, and the subcarrier spacing of all or part of newly-defined SIG field(s) may be set to 312.5 kHz. Meanwhile, the subcarrier spacing for a part of the newly-defined SIG field(s) may be set to a pre-defined value (e.g., 312.5 kHz or 78.125 kHz).

In the PPDU of FIG. 18, the L-LTF and the L-STF may be the same as conventional L-LTF and L-STF fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to the number of octets of a corresponding Physical Service Data Unit (PSDU). For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG which is identical to the L-SIG. BPSK modulation may be applied to the RL-SIG. The receiving STA may figure out that the RX PPDU is the HE PPDU or the EHT PPDU, based on the presence of the RL-SIG.

After the RL-SIG of FIG. 18, for example, EHT-SIG-A or one control symbol may be inserted. A symbol contiguous to the RL-SIG (i.e., EHT-SIG-A or one control symbol) may include 26-bit information and may further include information for identifying the type of the EHT PPDU. For example, when the EHT PPDU is classified into various types (e.g., an EHT PPDU supporting an SU mode, an EHT PPDU supporting a MU mode, an EHT PPDU related to the Trigger Frame, an EHT PPDU related to an Extended Range transmission, etc.), Information related to the type of the EHT PPDU may be included in a symbol contiguous to the RL-SIG.

A symbol contiguous to the RL-SIG may include, for example, information related to the length of the TXOP and information related to the BSS color ID. For example, the SIG-A field may be contiguous to the symbol contiguous to the RL-SIG (e.g., one control symbol). Alternatively, a symbol contiguous to the RL-SIG may be the SIG-A field.

For example, the SIG-A field may include 1) a DL/UL indicator, 2) a BSS color field which is an identifier of a BSS, 3) a field including information related to the remaining time of a current TXOP duration, 4) a bandwidth field including information related to the bandwidth, 5) a field including information related to an MCS scheme applied to an HE-SIG B, 6) a field including information related to whether a dual subcarrier modulation (DCM) scheme is applied to the HE-SIG B, 7) a field including information related to the number of symbols used for the HE-SIG B, 8) a field including information related to whether the HE-SIG B is generated over the entire band, 9) a field including information related to the type of the LTF/STF, 10) a field indicating the length of the HE-LTF and a CP length.

The SIG-B of FIG. 18 may include the technical features of HE-SIG-B shown in the example of FIGS. 8 to 9 as it is.

An STF of FIG. 18 may be used to improve automatic gain control estimation in a multiple input multiple output (MIMO) environment or an OFDMA environment. An LTF of FIG. 18 may be used to estimate a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. For example, a third type of STF (e.g., 4×STF) may be generated based on a third type STF sequence in which a non-zero coefficient is arranged with an interval of 4 subcarriers. An STF signal generated based on the third type STF sequence may have a period of 3.2 μs, and a periodicity signal of 3.2 μs may be repeated 5 times to become a second type STF having a length of 16 μs. Only some of the first to third type EHT-STF sequences may be used. In addition, the EHT-LTF field may also have first, second, and third types (i.e., 1x, 2x, 4×LTF). For example, the first/second/third type LTF field may be generated based on an LTF sequence in which a non-zero coefficient is arranged with an interval of 4/2/1 subcarriers. The first/second/third type LTF may have a time length of 3.2/6.4/12.8 μs. In addition, Guard Intervals (GIs) with various lengths (e.g., 0.8/1/6/3.2 μs) may be applied to the first/second/third type LTF.

Information related to the type of STF and/or LTF (including information related to GI applied to the LTF) may be included in the SIG A field and/or the SIG B field of FIG. 18.

The PPDU of FIG. 18 may support various bandwidths. For example, the PPDU of FIG. 18 may have a bandwidth of 20/40/80/160/240/320 MHz. For example, at least one field (e.g., STF, LTF, data) of FIG. 18 may be configured based on RUs illustrated in FIGS. 5 to 7, and the like. For example, when there is one receiving STA of the PPDU of FIG. 18, all fields of the PPDU of FIG. 18 may occupy the entire bandwidth. For example, when there are multiple receiving STAs of the PPDU of FIG. 18 (i.e., when MU PPDU is used), some fields (e.g., STF, LTF, data) of FIG. 18 may be configured based on the RUs shown in FIGS. 5 to 7. For example, the STF, LTF, and data fields for the first receiving STA of the PPDU may be transmitted/received through a first RU, and the STF, LTF, and data fields for the second receiving STA of the PPDU may be transmitted/received through a second RU. In this case, the locations/positions of the first and second RUs may be determined based on FIGS. 5 to 7, and the like.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Mesh Wi-Fi (i.e., Multi-AP Solution) is gaining acceptance in the market for better coverage, easier deployment and higher throughput.

It is desirable to improve the performance of the Mesh Wi-Fi by joint optimization of MAC and PHY for multi-AP system. Hardware for multi-AP systems is already on the market and costs little, unlike 16 spatial-stream system.

There are excellent techniques for improving the performance of multi-AP systems. The examples of the techniques include distributed MIMO, coordinated transmission, space/time/frequency sharing and reuse, effective relay scheme, and the like.

Figure 19:
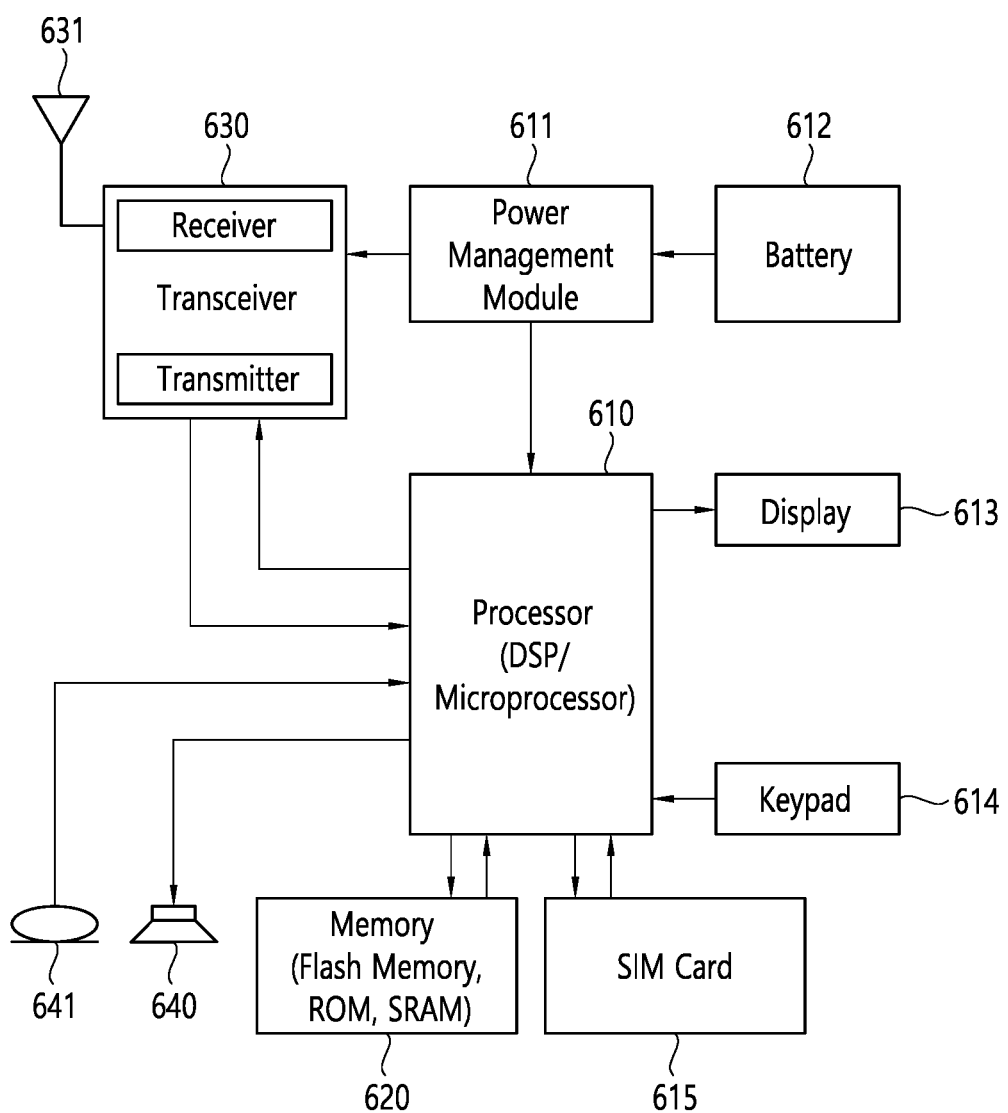
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Mesh Wi-Fi (i.e., Multi-AP Solution) is gaining acceptance in the market for better coverage, easier deployment and higher throughput.

It is desirable to improve the performance of the Mesh Wi-Fi by joint optimization of MAC and PHY for multi-AP system. Hardware for multi-AP systems is already on the market and costs little, unlike 16 spatial-stream system.

There are excellent techniques for improving the performance of multi-AP systems. The examples of the techniques include distributed MIMO, coordinated transmission, space/time/frequency sharing and reuse, effective relay scheme, and the like.

Figure 20:
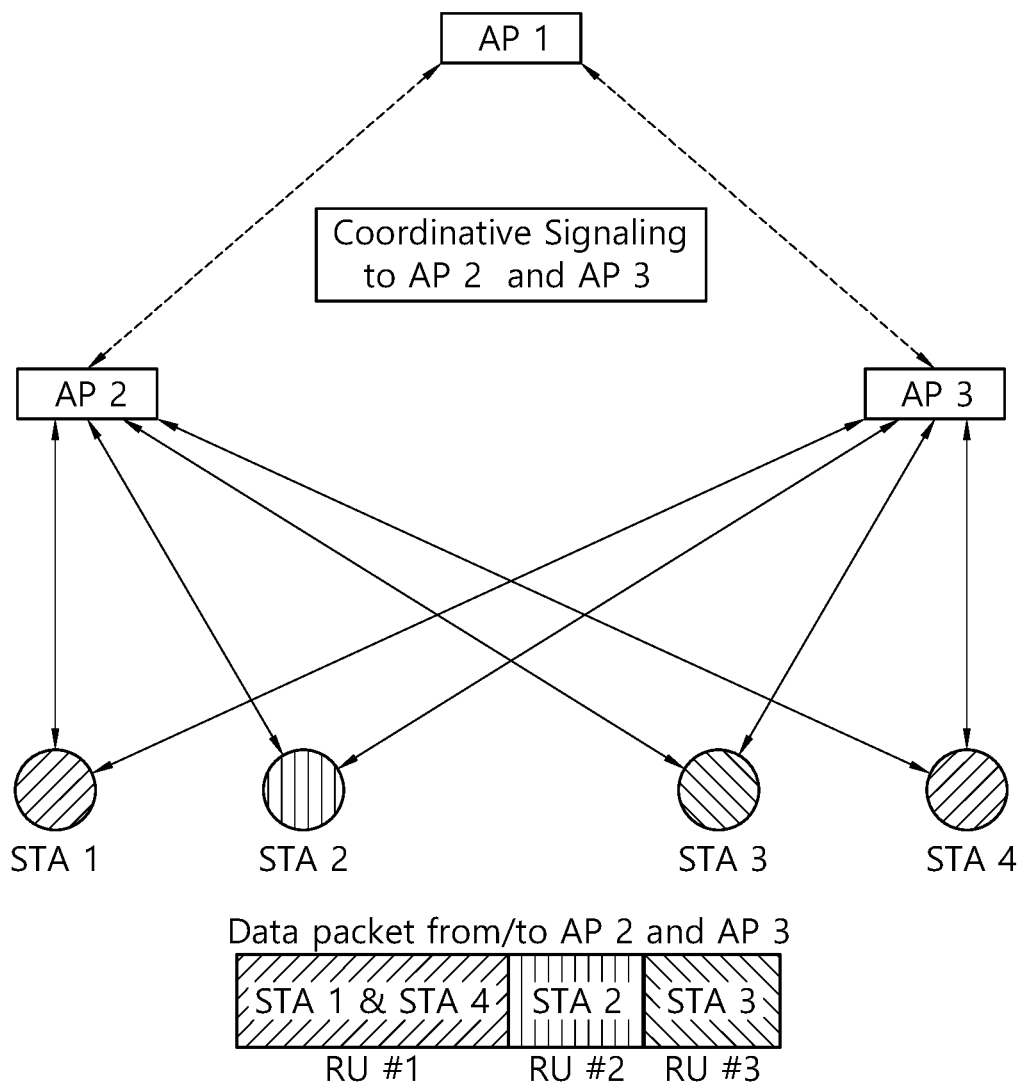
FIG. 20 shows an example of activating distributed MIMO transmission (e.g., joint transmission).

FIG. 20 shows an example of activating distributed MIMO transmission (e.g., joint transmission). Referring to FIG. 20, AP1 may start distributed MIMO transmission by sending a coordination signal to an AP2 and an AP3. The AP2 and AP3 may transmit/receive data to and from multiple STAs using OFDMA and MU-MIMO within one data packet. A STA2 and a STA3 may be allocated to different resource units (RUs), and each RU is a frequency segment. A STA1 and a STA4 may be allocated in the same resource unit using MU-MIMO. Each RU may be transmitted in multiple spatial streams.

Figure 21:
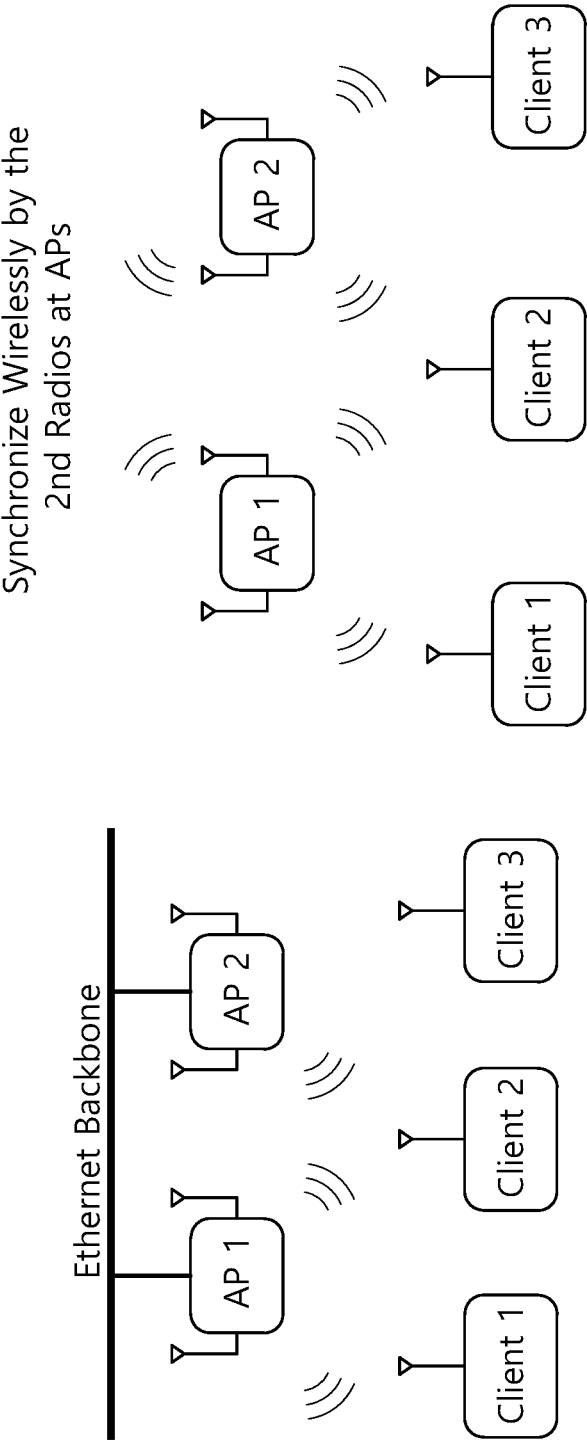
FIG. 21 is a diagram illustrating multi-AP coordination.

FIG. 21 is a diagram illustrating multi-AP coordination.

Multi-AP coordination utilizes a wired (e.g., enterprise) or wireless (e.g., home mesh) backbone for data and clock synchronizations.

In addition, the multi-AP coordination has improved link budget and regulatory power limits over single APs with large antenna arrays.

Techniques of the multi-AP coordination include null steering for interference avoidance, joint beamforming, and joint MU-MIMO.

Example 1: Null Steering for Interference Avoidance

Figure 22:
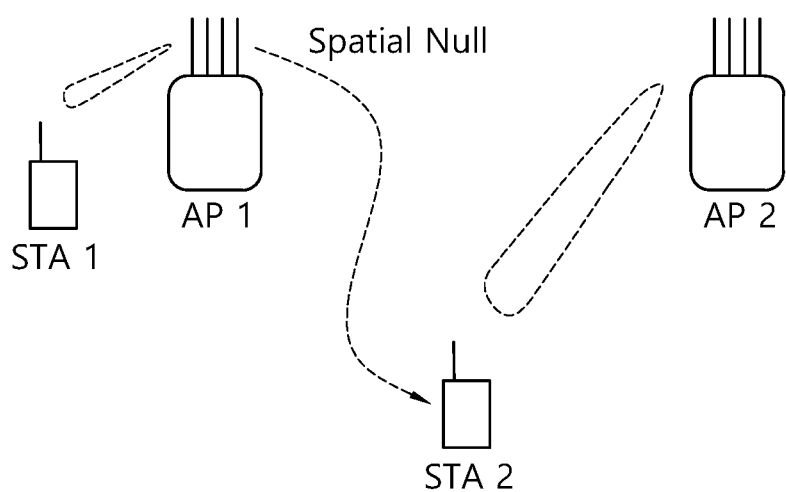
FIG. 22 shows an example of a null steering operation for interference avoidance.

FIG. 22 shows an example of a null steering operation for interference avoidance. The null steering for interference avoidance may be useful when the multi-AP has a large dimension (e.g., 4×4 or 8×8).

Figure 23:
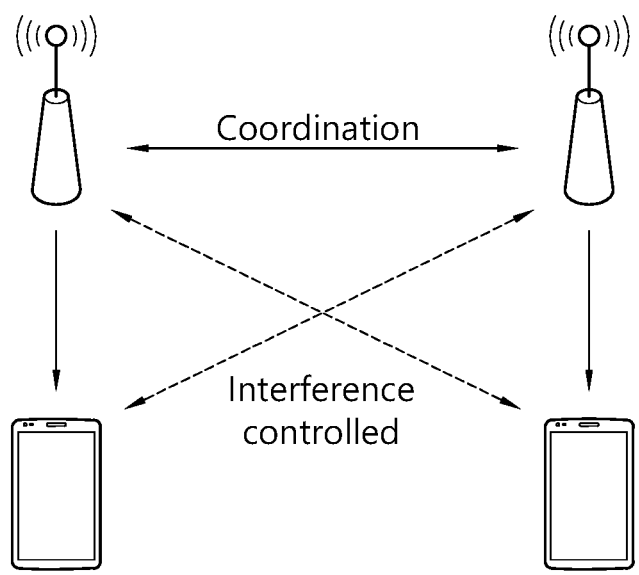
FIG. 23 shows an example in which AP coordination and interference are controlled.

FIG. 23 shows an example in which AP coordination and interference are controlled.

Coordinated scheduling: The coordinated scheduling may mitigate/reduce the number of collisions from APs/STAs of other BSSs.

In addition, the coordinated scheduling is a distributed mechanism and increases the number/probability of parallel transmission in a coordinated manner than spatial reuse. Message exchange between APs may be required.

Figure 24:
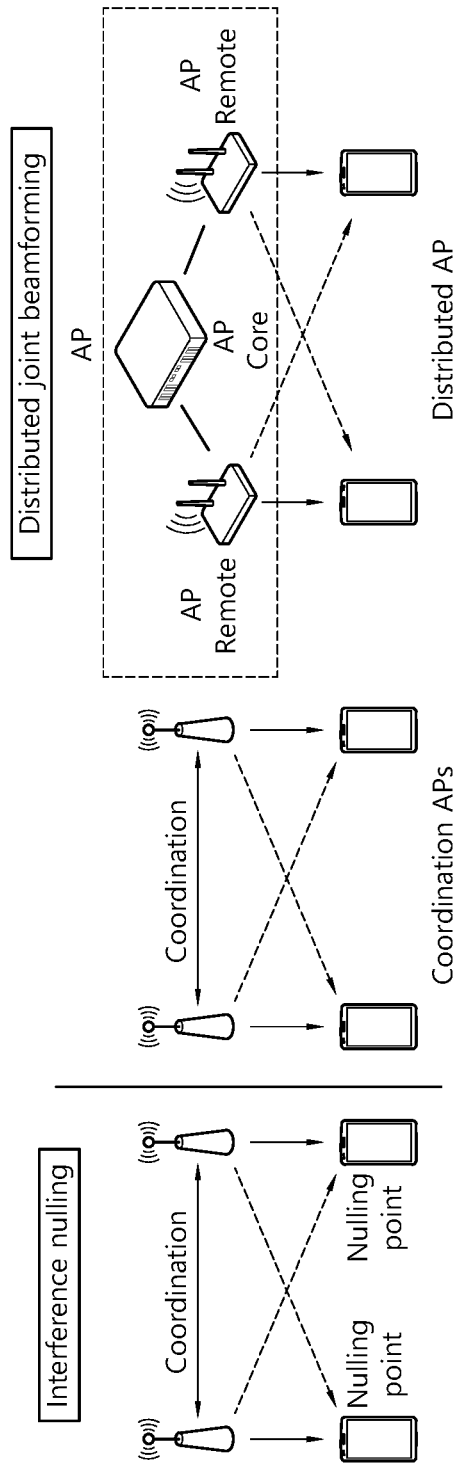
FIG. 24 shows interference nulling and distributed joint beamforming.

FIG. 24 shows interference nulling and distributed joint beamforming.

Coordinated beamforming: In the coordinated beamforming, downlink transmission can be performed simultaneously without co-channel interference due to beamforming, such as designating a nulling point to another STA or using distributed joint beamforming.

In addition, the coordinated beamforming may be suitable for managed deployments (e.g., corporate offices, hotels) and has the advantages of area throughput and consistent user experience. In addition, the coordinated beamforming may require coordinated downlink scheduling and improved MU sounding to reduce overhead, synchronization, and the like.

Figure 25:
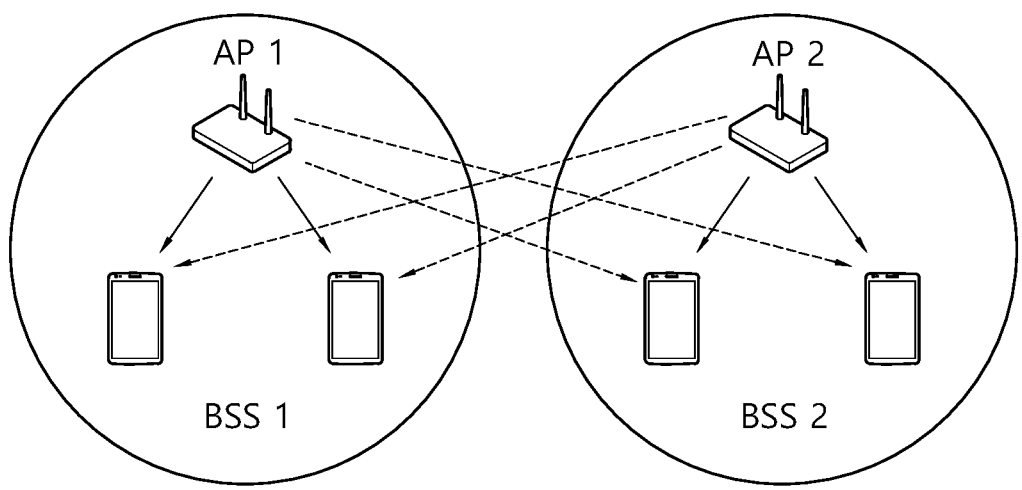
FIG. 25 shows an example of coordinated beamforming.

FIG. 25 shows an example of coordinated beamforming.

A solid arrow in FIG. 25 indicates data transmission within a BSS STA, and a dotted arrow in FIG. 25 is a null transmitted to the OBSS STAs. According to a main attribute of the coordinated beamforming, a signal for a user may be transmitted from only one AP which forms a null to the OBSS STA.

Figure 26:
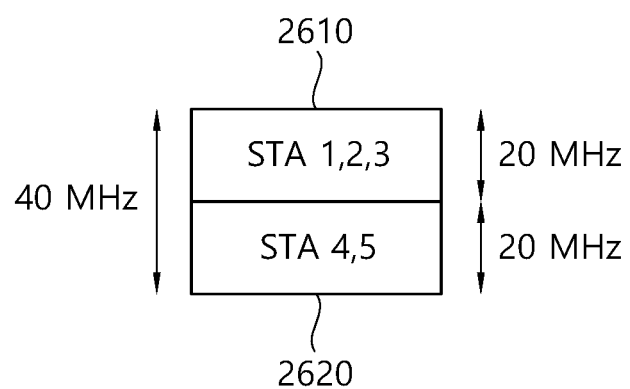
FIG. 26 is a diagram for explaining C-OFDMA.

FIG. 26 is a diagram for explaining C-OFDMA.

The coordinated-OFDMA (C-OFDMA) extends 11ax OFDMA which was based on a single BSS scenario to a multiple BSS scenario. In addition, the C-OFDMA may efficiently utilize frequency resources throughout the network. In addition, the C-OFDMA may improve efficiency when BSS traffic is not fully utilizing resources.

Referring to FIG. 26, a spectrum 2610 used for 20 MHz transmission of BSS1 and a spectrum 2620 used for 20 MHz transmission of BSS2 exist in a total band of 40 MHz. Synchronized transmission may be performed to obtain orthogonality. The STA1, STA2 and STA3 are allocated to the spectrum 2610 used for transmission of BSS1, and the STA4 and STA5 are allocated to spectrum 2620 used for transmission of BSS2.

Figure 27:
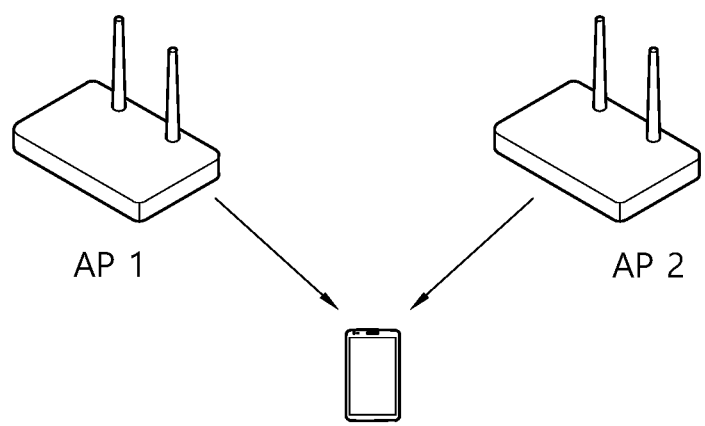
FIG. 27 shows an example of joint transmission (e.g., distributed MIMO).

FIG. 27 shows an example of joint transmission (e.g., distributed MIMO).

The joint transmission (J-Tx or JTX) may mean performing joint beamforming to a single STA. Referring to FIG. 27, one STA is being serviced by AP1 and AP2.

The joint transmission may have more stringent synchronization requirements and should be looked at separately. The joint transmission may be performed more easily than joint processing transmission for multiple STAs. However, the joint transmission may exploit beamforming and power gain from multiple APs.

Figure 28:
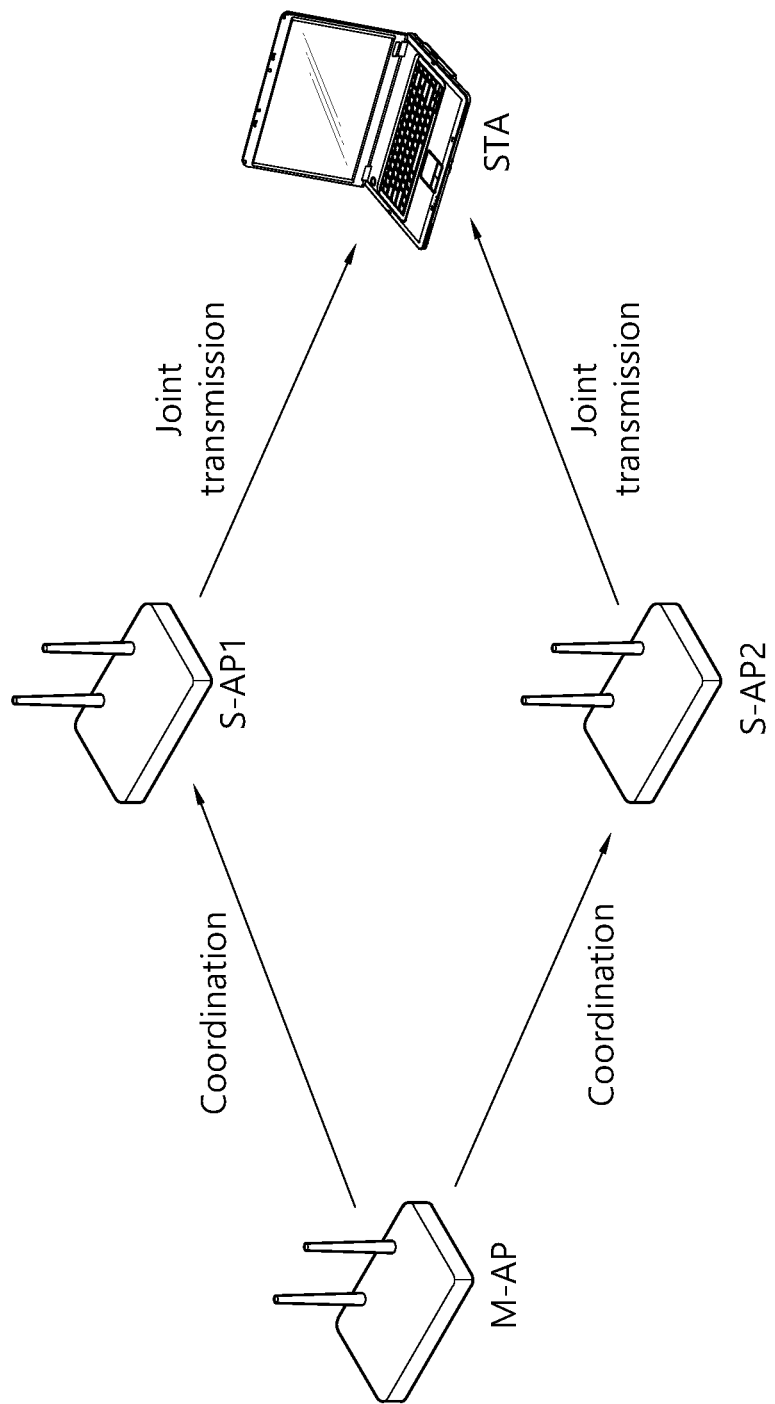
FIG. 28 shows an example of performing joint transmission through the M-AP and the S-AP.

FIG. 28 shows an example of performing joint transmission through the M-AP and the S-AP.

A master AP (M-AP) may act as an AP coordinator. A slave AP (S-AP) may participate in joint transmission coordinated by the M-AP, and may have both the functions of a STA and an AP. Referring to FIG. 28, S-AP1 and S-AP2 have a STA function in a coordination step and an AP function in a joint transmission step.

In the Wi-Fi system, Multi-AP coordination technology can share channel feedback information and scheduling information of the terminal between the APs when transmitting and receiving a data frame between the terminal and the AP. Through this, the Multi-AP coordination technology can minimize interference between BSSs during data transmission and reception or increase data transmission efficiency by having two or more APs participate in data transmission/reception for a terminal at a specific time. In the Wi-Fi system, this Multi-AP coordination technology has not been standardized yet, but in the recent IEEE802.11 EHT TIG, the standardization discussion related to Multi-AP coordination as the next wi-fi technology is being newly discussed. In the present specification, a method in which a plurality of APs can perform joint transmission (JTX) or coordinated transmission using the Multi-AP coordination in a Wi-Fi system is proposed. The Multi-AP (MAP) transmission may include a joint transmission and a coordinated transmission. The joint transmission is a method in which multiple APs simultaneously transmit one data to a STA using their own antennas. The coordinated transmission is a method of simultaneously transmitting one data to a STA using a coordinated scheduling scheme, a coordinated beamforming scheme, a C-OFDMA scheme, a coordinated spatial reuse scheme, and the like. The coordinated spatial reuse method is a method of reusing the same time-frequency resource in different spaces using power strength.

An example of the present specification described below relates to a technical feature of transmitting data using a plurality of APs.

A slave AP (S-AP) may receive a control frame (e.g., a trigger frame) from a master AP (M-AP). The control frame may include first information related to resource allocation for a first block acknowledgment (BA) frame that a station (STA) transmits to the first type AP. For example, a control frame (e.g., MAP trigger frame) transmitted by the M-AP may include information related to a multi-AP transmission type.

For example, the control frame (e.g., MAP trigger frame) transmitted by the M-AP may include resource allocation information for a block ACK (BA) indicating whether the STAs that have received the multi-AP data transmission (MAP transmission) from the S-AP have successfully received the data. For example, the control frame may include information related to which resource unit (RU) the STA transmits the BA frame for data transmitted by the S-AP. The M-AP may allocate different RUs so that resources (e.g., RUs) of BA frames transmitted by STAs do not overlap.

For example, the S-AP may synchronize between the M-AP and the S-AP based on the control frame. For example, the S-AP may compensate for a carrier frequency offset (CFO) using the STF and LTF sequences of the received control frame, and may perform synchronization by measuring timing.

After receiving the control frame from the M-AP, the S-AP may transmit a PPDU including data and resource allocation information for the STA's BA frame transmission to the STA. For example, the S-AP may transmit data to the STA based on information related to the Multi-AP data transmission type included in the control frame. The PPDU used by the S-AP for multi-AP data transmission (MAP transmission) may include RU allocation information used by the receiving STA to transmit a BA frame. For example, the RU allocation information included in the PPDU used for multi-AP data transmission (MAP transmission) transmitted by the S-AP may be the same as the RU allocation information included in the control frame received by the S-AP from the M-AP.

The S-AP may receive a BA frame for data from the STA. The STA may transmit the BA frame based on the resource allocation information transmitted by the S-AP, and the S-AP may receive the BA frame based on the resource allocation information.

Figure 29:
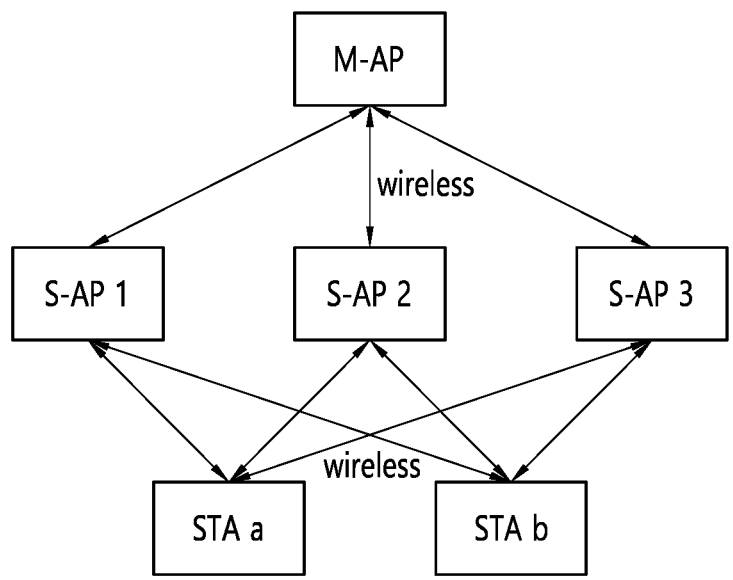
FIG. 29 shows an example of a network configured with multiple APs.

FIG. 29 is a diagram illustrating an example of a network configured with multiple APs.

The M-AP (Master AP) of FIG. 29 does not directly transmit/receive with the STA. Referring to FIG. 29, the M-AP (Master AP) may select a plurality of APs performing multi-AP communication by performing a selection procedure for multi-AP coordination with S-APs (Slave-APs). S-AP-1 to S-AP-3 selected by the M-AP may transmit signals to a STA-a and a STA-b. Descriptions of the M-AP, S-AP(s), and STA shown in FIG. 29 are as follows.

(1) Master AP

The Master AP may initiate and control the Multi-AP transmission (MAP transmission).

The Master AP can group the Slave-APs and manage the link with the Slave-APs so that the Slave-APs can share information.

The Master AP can manage the information of the BSS configured by the slave APs and the information of the STAs associated with the BSS.

(2) Slave-AP

The Slave-AP may associate with the Master AP to share control information, management information, and data traffic with each other.

The Slave-AP can basically perform the same function as the AP that can configure a BSS in the existing WLAN.

(3) STA

The STA may configure a BSS by forming an association with the slave AP as in the existing WLAN.

Slave APs, which are candidates for the multi-AP transmission (MAP transmission), may be able to transmit/receive directly to/from the Master AP. STAs, which are receivers of the multi-AP transmission (MAP transmission), may be able to directly transmit/receive with slave APs. The Master AP and STAs may not be able to directly transmit/receive to each other. However, the Master AP can know the presence of STAs. Each STA may be associated with one Slave AP or Master AP. One of the Slave APs may be a Master AP.

A procedure for transmitting data to a STA in a wireless LAN system including a plurality of APs (e.g., M-AP, S-AP, etc.) as shown in FIG. 29 is as follows.

Figure 30:
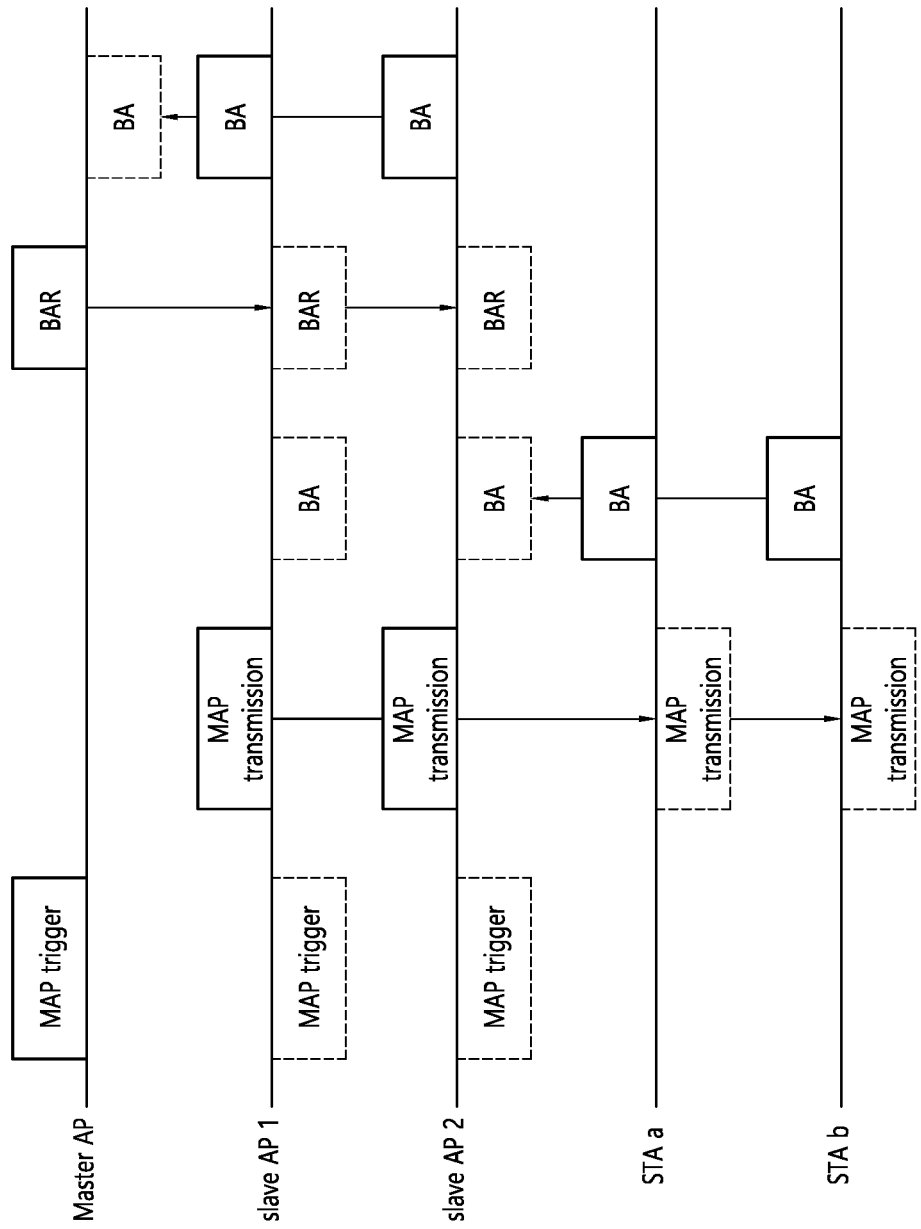
FIG. 30 is a diagram illustrating an example of a method of transmitting data in a wireless local area network (WLAN) system including a plurality of types of access points (APs).

FIG. 30 is a diagram illustrating an example of a method of transmitting data in a wireless local area network (WLAN) system including a plurality of types of access points (APs).

Referring to FIG. 30, the communication network of FIG. 30 may be the same as the communication network of FIG. 29, and the M-AP (Master AP) of FIG. 30 does not directly transmit/receive with the STA.

As a pre-procedure of the Multi-AP transmission, the M-AP and the S-AP may exchange and negotiate capability information. For example, the S-AP may transmit capability information related to the number of antennas, transmission bands, transmission channels, transmission schemes (e.g., distributed MIMO, C-OFDMA, coordinated beamforming), coordinated spatial reuse), and/or resource information related to block ACK (BA) frame transmission to the M-AP. For example, the M-AP may determine information such as the number of antennas of the S-AP, a transmission band, and/or a transmission channel to be used for the multi-AP transmission and transmit the determined information to the S-AP.

The M-AP may select an S-AP to perform the multi-AP transmission. For example, the M-AP may select an S-AP to perform the multi-AP transmission based on the previously performed procedure. The M-AP may transmit a control frame (e.g., a MAP trigger frame) related to the multi-AP transmission to the selected S-APs. For example, the M-AP may select an S-AP-1 and an S-AP-2 as S-APs to perform the Multi-AP transmission, and transmit the control frame (e.g., a MAP trigger frame) related to the Multi-AP transmission to the S-AP-1 and the S-AP-2. For example, only the S-AP-1 may be selected as the S-AP to perform the multi-AP transmission, and a control frame (e.g., MAP trigger frame) related to the multi-AP transmission may be transmitted to the S-AP-1. For example, only the S-AP-2 may be selected as the S-AP to perform the multi-AP transmission, and a control frame (e.g., MAP trigger frame) related to the multi-AP transmission may be transmitted to the S-AP-2. The M-AP may notify the S-APs of the start of a data transmission procedure using the Multi-AP by transmitting the control frame.

The S-AP-1 and the S-AP-2 may receive the control frame from the M-AP. The S-AP may synchronize between the M-AP and the S-AP based on the control frame. For example, the S-AP-1 and the S-AP-2 may compensate for carrier frequency offset (CFO) using the STF and LTF sequences of the received control frame, and measure timing to obtain synchronization. That is, the control frame may provide the S-AP with information necessary to perform the CFO compensation, synchronization, and the like.

For example, the control frame (e.g., MAP trigger frame) transmitted by the M-AP may include information related to a multi-AP transmission type. Information related to the Multi-AP transmission type included in the control frame may be shown in Table 5 below.

TABLE 5

| B0 B1 B2 | Multi-AP Data Transmission Type |
| --- | --- |
| 000 | Distributed MIMO |
| 001 | Coordinated OFDMA |
| 011 | Coordinated BF |
| 010 | Coordinated SR |
| Otherwise | Reserved |

Referring to Table 5, the control frame may include information related to the multi-AP data transmission type. For example, the Multi-AP data transmission type may include a distributed MIMO (e.g., joint transmission), C-OFDMA (coordinated OFDMA), coordinated beamforming (coordinated BF), coordinated spatial reuse (coordinated SR (coordinated SR) spatial reuse)) or a combination of two or more. The Multi-AP data transmission type may be based on the method described in FIGS. 21 to 28.

For example, the control frame (e.g., MAP trigger frame) transmitted by the M-AP may include resource allocation information for a block ACK (BA) indicating whether the STAs that have received the multi-AP data transmission (MAP transmission) from the S-AP have successfully received the data. For example, the control frame may include information related to which resource unit (RU) the STA transmits the BA frame for data transmitted by the S-AP. The M-AP may allocate different RUs so that resources (e.g., RUs) of BA frames transmitted by STAs do not overlap.

S-APs may not know through which resource the other S-APs receives the BA frame from the STA. Accordingly, when the S-AP directly allocates a resource for BA frame transmission to a STA, BA frames transmitted by the STAs may collide. On the other hand, the M-AP may allocate RUs for the BA frames transmitted by the STAs, respectively, and inform the S-APs through a control frame (e.g., a MAP trigger frame). In this case, since RUs for BA frames transmitted by STAs are allocated differently, an advantageous effect of preventing collision between BA frames may occur.

The S-AP may transmit data to the STA after receiving the control frame from the M-AP. For example, the S-AP may transmit data to the STA based on information related to the Multi-AP data transmission type included in the control frame. That is, the information related to the multi-AP data transmission type included in the control frame may be used by the M-AP to determine the data transmission type of the S-AP through the control frame.

A trigger based PPDU may not be used for the Multi-AP data transmission (MAP transmission) of the S-AP. When the S-AP transmits data to one STA, the S-AP may use a single user PPDU (SU PPDU) format. When the S-AP transmits data to a plurality of STAs, the S-AP may use a multiple user PPDU (MU PPDU) format.

For example, the S-AP-1 and the S-AP-2 may transmit data using the SU PPDU. For example, the S-AP-1 may transmit data using the SU PPDU, and the S-AP-2 may transmit data using the MU PPDU. For example, the S-AP-1 and the S-AP-2 may transmit data using an MU PPDU.

For example, the S-AP-1 and the S-AP-2 may transmit data using a coordinated beamforming (coordinated BF) scheme. The S-AP-1 may transmit data using the MU PPDU, and the S-AP-2 may transmit data using the SU PPDU. PPDUs (i.e., MU PPDU and SU PPDU) transmitted by the S-AP-1 and the S-AP-2 should be transmitted using beamforming from the legacy part so as not to interfere with other STAs. In other words, when the PPDUs (i.e., MU PPDU and SU PPDU) transmitted by the S-AP-1 and the S-AP-2 are transmitted using beamforming from the legacy part, a technical effect of not interfering with other STAs may occur.

A PPDU used for the multi-AP data transmission (MAP transmission) transmitted by the S-AP may include a control field. For example, the control field included in the PPDU may be an EHT SIG field, and the EHT SIG field may include a common field for all STAs and a user specific field for a specific STA.

The control field may include an identifier of a receiving STA. For example, the common field of the control field may include association identifier (AID) information of the receiving STA. However, in the multi-AP environment, AIDs of STAs associated with different S-APs may overlap. Therefore, there is a need for a method for avoiding duplication of AIDs.

For example, the control field may include both the AID of the receiving STA and BSSID information of the S-AP to which the receiving STA belongs. For example, the control field may include new ID information generated based on the information of the AID of the receiving STA and the BSSID of the S-AP to which the receiving STA belongs. For example, the control field may include new ID information generated by hashing the AID of the receiving STA and the BSSID of the S-AP to which the receiving STA belongs. The control field included in the PPDU used for the multi-AP data transmission may contain both the AID of the receiving STA and the BSSID information of the S-AP to which the receiving STA belongs, or the new ID information generated based the receiving STA's AID and the BSSID of the S-AP. Through this, a technical effect of preventing overlapping of AIDs between different STAs may occur.

The PPDU used by the S-AP for the multi-AP data transmission (MAP transmission) may include RU allocation information used by the receiving STA to transmit a BA frame. For example, the RU allocation information included in the PPDU used for the multi-AP data transmission (MAP transmission) transmitted by the S-AP may be the same as the RU allocation information included in the control frame received by the S-AP from the M-AP. That is, the S-AP may deliver the RU allocation information received from the M-AP to the STA. When the M-AP allocates RUs for the BA frames transmitted by the STAs and informs the S-APs through a control frame (e.g., a MAP trigger frame), the RUs for the BA frames transmitted by the STAs can be allocated differently from each other. Through this, a technical effect of preventing collision between BA frames may occur.

The S-AP may perform the multi-AP data transmission to one or more STAs. For example, the S-AP-1 may transmit data to the STA-a, and the S-AP-2 may transmit data to the STA-b. For example, the S-AP-1 may transmit data to the STA-a and the STA-b, and the S-AP-2 may transmit data to the STA-a. For example, the S-AP-1 may transmit data to the STA-b, and the S-AP-2 may transmit data to the STA-a and the STA-b. For example, the S-AP-1 may transmit data to the STA-a and the STA-b, and the S-AP-2 may transmit data to the STA-a and the STA-b.

The STA may receive a PPDU used for the multi-AP data transmission (MAP transmission) from the S-AP. The STA may transmit a BA frame for the received data to the S-AP based on the RU allocation information included in the received PPDU. Since the M-AP has allocated RUs, respectively, for the BA frames transmitted by the STAs, RUs for the BA frames transmitted by the STAs may be allocated differently, thereby preventing collision between BA frames.

For example, the STA may transmit the BA using the UL OFDMA scheme. The STA may transmit a BA frame to the S-AP based on the RU allocation information, and different RUs may be allocated to different STAs. For example, even if a plurality of STAs transmit the BA frame at the same time, a technical effect in which a plurality of STAs transmit BA frames through different time-frequency resources may occur.

Since the S-AP knows the RU allocation information related to the BA frame to be transmitted by the receiving STA, the S-AP may receive the BA frame from the STA. The S-AP may know whether the STA has successfully received data based on the BA frame. For example, the S-AP may decode a BA frame received in the allocated RU, and may know whether the STA has successfully received data or failed to receive data based on the decoding result.

The S-AP may store information related to whether the STA has successfully received data (i.e., a value indicated by the BA frame). When the S-AP receives a BA request frame (e.g., a BAR frame) from the M-AP, the S-AP may transmit a BA frame including information related to whether the STA has successfully received data to the M-AP. For example, based on the first BA frame received from the STA-a and the second BA frame received from the STA-b, the S-AP may transmit a third BA frame related to whether the STA-a and the STA-b have received data, the M-AP.

Figure 31:
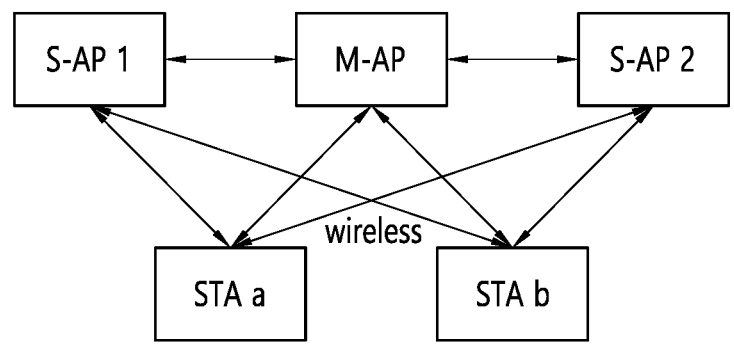
FIG. 31 is a diagram illustrating an example of a network configured with multiple APs.

FIG. 31 is a diagram illustrating an example of a network configured with multiple APs.

The M-AP (Master AP) of FIG. 31 does not directly transmit/receive with the STA. Referring to FIG. 31, the M-AP (Master AP) may select a plurality of APs performing multi-AP communication by performing a selection procedure for multi-AP coordination with S-APs (Slave-APs). S-AP-1 to S-AP-3 selected by the M-AP may transmit signals to a STA-a and a STA-b. Descriptions of the M-AP, S-AP(s), and STA shown in FIG. 31 are as follows.

(1) Master AP

The Master AP may initiate and control the Multi-AP transmission (MAP transmission).

The Master AP can group the Slave-APs and manage the link with the Slave-APs so that the Slave-APs can share information.

The Master AP can manage the information of the BSS configured by the slave APs and the information of the STAs associated with the BSS.

The Master AP can basically perform the same functions as the AP that can configure a BSS in the existing WLAN.

(2) Slave-AP

The Slave-AP may associate with the Master AP to share control information, management information, and data traffic with each other.

The Slave-AP can basically perform the same function as the AP that can configure a BSS in the existing WLAN.

(3) STA

As in the existing WLAN, the STA may form an association with the Slave AP or the Master AP to configure the BSS.

The Master AP and the Slave AP may directly transmit/receive each other. The Master AP and the STA may be able to directly transmit and receive each other. The slave AP and the STA may directly transmit/receive each other. One of the Slave APs may be a Master AP.

As shown in FIG. 31, a procedure for transmitting data to a STA in a wireless LAN system including a plurality of APs (e.g., M-AP, S-AP, etc.) may be as follows.

Figure 32:
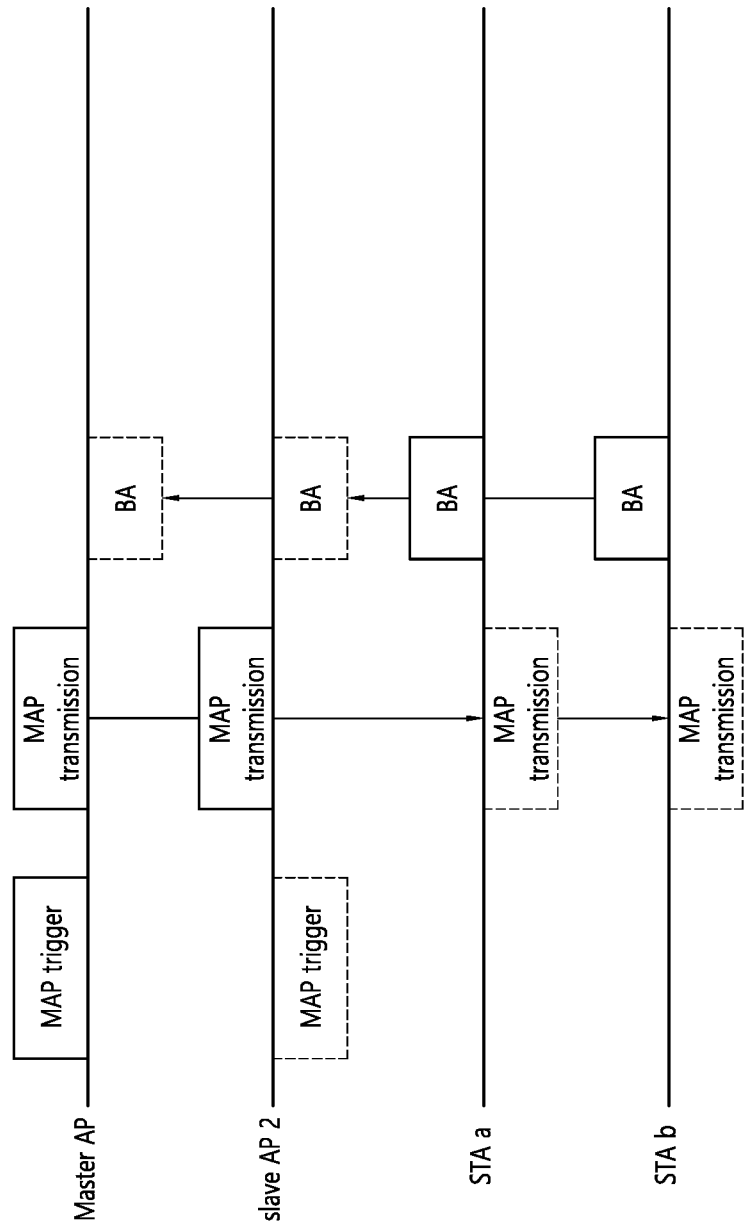
FIG. 32 is a diagram illustrating an example of a method of transmitting data in a wireless local area network (WLAN) system including a plurality of types of access points (APs).

FIG. 32 is a diagram illustrating an example of a method of transmitting data in a wireless local area network (WLAN) system including a plurality of types of access points (APs).

Referring to FIG. 32, the communication network of FIG. 32 may be the same as the communication network of FIG. 31, and the M-AP (Master AP) of FIG. 32 may perform direct transmission/reception with the STA.

As a pre-procedure of the Multi-AP transmission, the M-AP and the S-AP may exchange and negotiate capability information. For example, the S-AP may transmit capability information related to the number of antennas, transmission bands, transmission channels, transmission schemes (e.g., distributed MIMO, C-OFDMA, coordinated beamforming), coordinated spatial reuse), and/or resource information related to block ACK (BA) frame transmission to the M-AP. For example, the M-AP may determine information such as the number of antennas of the S-AP, a transmission band, and/or a transmission channel to be used for the multi-AP transmission and transmit the determined information to the S-AP.

The M-AP may select an AP to perform the multi-AP transmission. Since the M-AP may also perform the Multi-AP transmission, the M-AP may determine whether or not to perform the Multi-AP data transmission. For example, the M-AP may select an S-AP to perform the Multi-AP transmission based on the previously performed prior procedure, and may determine whether the M-AP will perform the Multi-AP transmission. The M-AP may transmit a control frame (e.g., a MAP trigger frame) related to the multi-AP transmission to the selected S-AP. For example, the M-AP may select an S-AP-2 and the M-AP as APs to perform the Multi-AP transmission, and transmit a control frame (e.g., a MAP trigger frame) related to the Multi-AP transmission to S-AP-2. The M-AP may notify the S-AP-2 of the start of a data transmission procedure using the Multi-AP by transmitting the control frame.

S-AP-2 may receive the control frame from the M-AP. The S-AP-2 may synchronize between the M-AP and the S-AP based on the control frame. For example, the S-AP-1 and the S-AP-2 may compensate for carrier frequency offset (CFO) using the STF and LTF sequences of the received control frame, and measure timing to obtain synchronization. That is, the control frame may provide the S-AP with information necessary to perform the CFO compensation, synchronization, and the like.

For example, the control frame (e.g., MAP trigger frame) transmitted by the M-AP may include information related to the multi-AP transmission type. Information related to the Multi-AP transmission type included in the control frame may be as shown in Table 5 above.

Referring to Table 5, the control frame may include information related to the multi-AP data transmission type. For example, the Multi-AP data transmission type may include a distributed MIMO (e.g., joint transmission), C-OFDMA (coordinated OFDMA), coordinated beamforming (coordinated BF), coordinated spatial reuse (coordinated SR (coordinated SR) spatial reuse)) or a combination of two or more. The Multi-AP data transmission type may be based on the method described in FIGS. 21 to 28.

For example, the control frame (e.g., MAP trigger frame) transmitted by the M-AP may include resource allocation information for a block ACK (BA) indicating whether the STAs (STA-a and STA-b) that have received the multi-AP data transmission (MAP transmission) from the S-AP-2 have successfully received the data. For example, the control frame may include information related to which resource unit (RU) the STA-a and the STA-b each transmits the BA frame for data transmitted by the S-AP-2. The M-AP may allocate different RUs so that resources (e.g., RUs) of BA frames transmitted by STAs (STA-a and STA-b) do not overlap.

The S-AP may not know through which resource another S-AP (or M-AP) receives the BA frame from the STA. Accordingly, when the S-AP directly allocates a resource for the BA frame to a STA, BA frames transmitted by the STAs may collide. On the other hand, the M-AP may allocate RUs for the BA frames transmitted by the STAs, respectively, and inform the S-APs through a control frame (e.g., a MAP trigger frame). In this case, since RUs for BA frames transmitted by STAs are allocated differently, an advantageous effect of preventing collision between BA frames may occur.

The S-AP may transmit data to the STA after receiving the control frame from the M-AP. The M-AP may transmit data to the STA after transmitting the control frame to the S-AP. For example, the S-AP may transmit data to the STA based on information related to the Multi-AP data transmission type included in the control frame. For example, the M-AP may transmit data to the STA based on information related to the Multi-AP data transmission type included in the control frame. That is, the information related to the multi-AP data transmission type included in the control frame may be used by the M-AP to determine the data transmission type of the S-AP through the control frame.

When the M-AP and the S-AP perform the multi-AP data transmission (MAP transmission), a trigger based PPDU may not be used. When the M-AP or the S-AP transmits data to one STA, a single user PPDU (SU PPDU) format may be used. When the M-AP or the S-AP transmits data to a plurality of STAs, a multiple user PPDU (MU PPDU) format may be used.

For example, the M-AP and S-AP-2 may transmit data using the SU PPDU. For example, the M-AP may transmit data using the SU PPDU, and the S-AP-2 may transmit data using the MU PPDU. For example, the M-AP and S-AP-2 may transmit data using the MU PPDU.

For example, the M-AP and the S-AP-2 may transmit data using a coordinated beamforming (coordinated BF) scheme. The M-AP may transmit data using the MU PPDU, and the S-AP-2 may transmit data using the SU PPDU. PPDUs (i.e., MU PPDU and SU PPDU) transmitted by the M-AP and the S-AP-2 should be transmitted using beamforming from the legacy part so as not to interfere with other STAs. In other words, when the PPDUs (i.e., MU PPDU and SU PPDU) transmitted by the S-AP-1 and the S-AP-2 are transmitted using beamforming from the legacy part, a technical effect of not interfering with other STAs may occur.

A PPDU used for the multi-AP data transmission (MAP transmission) transmitted by the S-AP may include a control field. For example, the control field included in the PPDU may be an EHT SIG field, and the EHT SIG field may include a common field for all STAs and a user specific field for a specific STA.

The control field may include an identifier of a receiving STA. For example, the common field of the control field may include association identifier (AID) information of the receiving STA. However, in the multi-AP environment, AIDs of STAs associated with different S-APs (or M-APs) may overlap. Therefore, there is a need for a method for avoiding duplication of AIDs.

For example, the control field may include both the AID of the receiving STA and BSSID information of the S-AP (or the M-AP) to which the receiving STA belongs. For example, the control field may include new ID information generated based on the information of the AID of the receiving STA and the BSSID of the S-AP (or the M-AP) to which the receiving STA belongs. For example, the control field may include new ID information generated by hashing the AID of the receiving STA and the BSSID of the S-AP (or the M-AP) to which the receiving STA belongs. The control field included in the PPDU used for the multi-AP data transmission may contain both the AID of the receiving STA and the BSSID information of the S-AP (or the M-AP) to which the receiving STA belongs, or the new ID information generated based the receiving STA's AID and the BSSID of the S-AP (or the M-AP). Through this, a technical effect of preventing overlapping of AIDs between different STAs may occur.

The PPDU used by the S-AP and the M-AP for the multi-AP data transmission (MAP transmission) may include RU allocation information used by the receiving STA to transmit a BA frame. For example, the RU allocation information included in the PPDU used for the multi-AP data transmission (MAP transmission) transmitted by the S-AP may be the same as the RU allocation information included in the control frame received by the S-AP from the M-AP. For example, the RU allocation information included in the PPDU used for the multi-AP data transmission (MAP transmission) transmitted by the M-AP may be the same as the RU allocation information included in the control frame transmitted by the M-AP to the S-AP. That is, the S-AP may deliver the RU allocation information received from the M-AP to the STA. When the M-AP allocates RUs for the BA frames transmitted by the STAs and informs the S-APs through a control frame (e.g., a MAP trigger frame), the RUs for the BA frames transmitted by the STAs can be allocated differently from each other. Through this, a technical effect of preventing collision between BA frames may occur.

The M-AP and the S-AP may perform the Multi-AP data transmission to one or more STAs. For example, the S-AP-2 may transmit data to the STA-a, and the M-AP may transmit data to the STA-b. For example, the S-AP-2 may transmit data to the STA-a and the STA-b, and the M-AP may transmit data to the STA-a and the STA-b. For example, the S-AP-2 may transmit data to the STA-b, and the M-AP may transmit data to the STA-a and the STA-b. For example, the S-AP-2 may transmit data to the STA-a and the STA-b, and the M-AP may transmit data the STA-a The STA may receive a PPDU used for the multi-AP data transmission (MAP transmission) from the M-AP or the S-AP. For example, the STA-a and the STA-b may receive a PPDU used for the multi-AP data transmission (MAP transmission) from the S-AP-2.

The STA may transmit a BA frame for the received data based on the RU allocation information included in the received PPDU. For example, the STA may transmit the BA using the UL OFDMA scheme. The STA may transmit a BA frame based on the RU allocation information, and different RUs may be allocated to different STAs. For example, even if a plurality of STAs simultaneously transmit a BA frame, the plurality of STAs may transmit the BA frame through different time-frequency resources. For example, the STA-a may be allocated a first RU for BA frame transmission, and the STA-b may be allocated a second RU for BA frame transmission.

Since the M-AP and the S-AP knows the RU allocation information related to the BA frame to be transmitted by the receiving STA, they may receive the BA frame from the STA based on the RU allocation information. The S-AP may know whether the STA has successfully received data based on the BA frame. For example, each of the M-AP and the S-AP may decode a BA frame received in the allocated RU, and may know whether the STA has successfully received data or failed to receive data based on the decoding result.

The S-AP may store information related to whether the STA has successfully received data (i.e., a value indicated by the BA frame). For example, the S-AP may transmit information (e.g., a BA frame) including information related to whether the STA has successfully received data to the M-AP.

Figure 33:
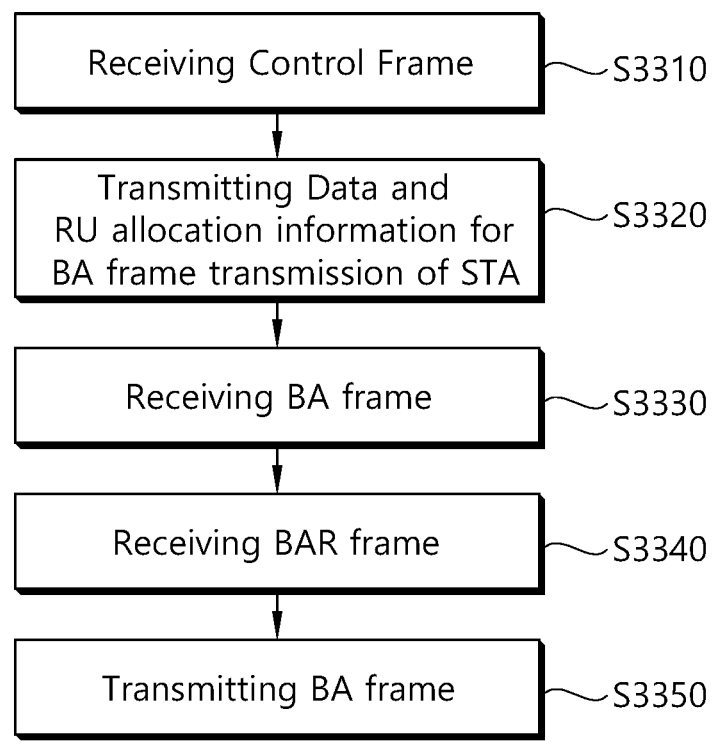
FIG. 33 is a flowchart for explaining an embodiment of an S-AP operation.

FIG. 33 is a flowchart for explaining an embodiment of an S-AP operation.

Referring to FIG. 33, the S-AP may receive a control frame (e.g., a trigger frame) from the M-AP (S3310). For example, a control frame (e.g., MAP trigger frame) transmitted by the M-AP may include information related to a multi-AP transmission type. For example, information related to the Multi-AP transmission type included in the control frame may be as shown in Table 5 above.

For example, the control frame (e.g., MAP trigger frame) transmitted by the M-AP may include resource allocation information for a block ACK (BA) indicating whether the STAs that have received the multi-AP data transmission (MAP transmission) from the S-AP have successfully received the data. For example, the control frame may include information related to which resource unit (RU) the STA transmits the BA frame for data transmitted by the S-AP. The M-AP may allocate different RUs so that resources (e.g., RUs) of BA frames transmitted by STAs do not overlap.

For example, the S-AP may synchronize between the M-AP and the S-AP based on the control frame. For example, the S-AP may compensate for carrier frequency offset (CFO) using the STF and LTF sequences of the received control frame, and measure timing to obtain synchronization.

After receiving the control frame from the M-AP, the S-AP may transmit data and resource allocation information for the STA's BA frame transmission to the STA (S3320). For example, the S-AP may transmit data to the STA based on information related to the Multi-AP data transmission type included in the control frame. The PPDU used by the S-AP for multi-AP data transmission (MAP transmission) may include RU allocation information used by the receiving STA to transmit a BA frame. For example, the RU allocation information included in the PPDU used for multi-AP data transmission (MAP transmission) transmitted by the S-AP may be the same as the RU allocation information included in the control frame received by the S-AP from the M-AP.

The S-AP may receive a BA frame for data from the STA (S3330). The STA may transmit the BA frame based on the resource allocation information transmitted by the S-AP, and the S-AP may receive the BA frame based on the resource allocation information.

The S-AP may receive a BA request (BAR) frame from the M-AP (S3340). When the S-AP receives the BAR frame from the M-AP, based on the BA frame received from the STAs, the S-AP may transmit a BA frame including information related to whether the STAs have successfully received data to the M-AP (S3350). For example, based on the first BA frame received from the STA-a and the second BA frame received from the STA-b, the S-AP may transmit a third BA frame related to whether the STA-a and the STA-b have received data to the M-AP.

Figure 34:
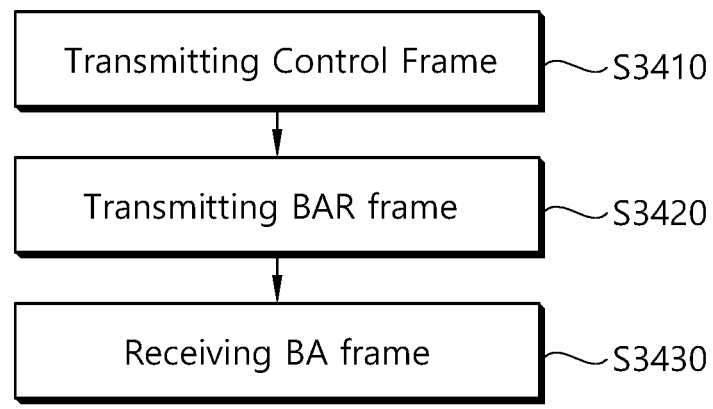
FIG. 34 is a flowchart for explaining an embodiment of an M-AP operation.

FIG. 34 is a flowchart for explaining an embodiment of an M-AP operation.

Referring to FIG. 34, the M-AP may transmit a control frame (e.g., a trigger frame) to the S-AP (S3410). For example, a control frame (e.g., MAP trigger frame) transmitted by the M-AP may include information related to a multi-AP transmission type. For example, information related to the Multi-AP transmission type included in the control frame may be as shown in Table 5 above.

For example, the control frame (e.g., MAP trigger frame) transmitted by the M-AP may include resource allocation information for a block ACK (BA) indicating whether the STAs that have received the multi-AP data transmission (MAP transmission) from the S-AP have successfully received the data. For example, the control frame may include information related to which resource unit (RU) the STA transmits the BA frame for data transmitted by the S-AP. The M-AP may allocate different RUs so that resources (e.g., RUs) of BA frames transmitted by STAs do not overlap.

For example, the S-AP may synchronize between the M-AP and the S-AP based on the control frame. For example, the S-AP may compensate for carrier frequency offset (CFO) using the STF and LTF sequences of the received control frame, and measure timing to obtain synchronization.

The M-AP may transmit a BAR (BA request) frame to the S-AP (S3420). When the S-AP receives the BAR frame from the M-AP, based on the BA frame received from the STAs, the S-AP may transmit a BA frame including information related to whether the STAs have successfully received data to the M-AP. The M-AP may receive the BA frame including information related to whether the STAs have successfully received data from the S-AP (S3430). For example, based on the first BA frame received from the STA-a and the second BA frame received from the STA-b, the S-AP may transmit a third BA frame related to whether the STA-a or the STA-b receives data or not to the M-AP, and the M-AP may receive the third BA frame from the S-AP.

Figure 35:
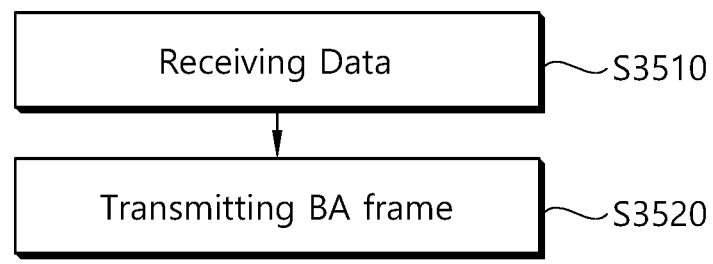
FIG. 35 is a flowchart illustrating an embodiment of a STA operation.

FIG. 35 is a flowchart illustrating an embodiment of a STA operation.

Referring to FIG. 35, a STA (e.g., a non-AP STA) may receive data from the S-AP (S3510). For example, the S-AP may transmit data to the STA after receiving the control frame from the M-AP. For example, the S-AP may transmit data to the STA based on information related to the Multi-AP data transmission type included in the control frame.

A trigger based PPDU may not be used for the Multi-AP data transmission (MAP transmission) of the S-AP. When the S-AP transmits data to one STA, the S-AP may use a single user PPDU (SU PPDU) format. When the S-AP transmits data to a plurality of STAs, the S-AP may use a multiple user PPDU (MU PPDU) format.

For example, the S-AP-1 and the S-AP-2 may transmit data using the SU PPDU. For example, the S-AP-1 may transmit data using the SU PPDU, and the S-AP-2 may transmit data using the MU PPDU. For example, the S-AP-1 and the S-AP-2 may transmit data using an MU PPDU.

For example, the S-AP-1 and the S-AP-2 may transmit data using a coordinated beamforming (coordinated BF) scheme. The S-AP-1 may transmit data using the MU PPDU, and the S-AP-2 may transmit data using the SU PPDU. PPDUs (i.e., MU PPDU and SU PPDU) transmitted by the S-AP-1 and the S-AP-2 should be transmitted using beamforming from the legacy part so as not to interfere with other STAs.

A PPDU used for the multi-AP data transmission (MAP transmission) transmitted by the S-AP may include a control field. For example, the control field included in the PPDU may be an EHT SIG field, and the EHT SIG field may include a common field for all STAs and a user specific field for a specific STA.

The control field may include an identifier of a receiving STA. For example, the common field of the control field may include association identifier (AID) information of the receiving STA. However, in the multi-AP environment, AIDs of STAs associated with different S-APs may overlap. Therefore, there is a need for a method for avoiding duplication of AIDs.

For example, the control field may include both the AID of the receiving STA and BSSID information of the S-AP to which the receiving STA belongs. For example, the control field may include new ID information generated based on the information of the AID of the receiving STA and the BSSID of the S-AP to which the receiving STA belongs. For example, the control field may include new ID information generated by hashing the AID of the receiving STA and the BSSID of the S-AP to which the receiving STA belongs. The control field included in the PPDU used for the multi-AP data transmission may contain both the AID of the receiving STA and the BSSID information of the S-AP to which the receiving STA belongs, or the new ID information generated based the receiving STA's AID and the BSSID of the S-AP. Through this, a technical effect of preventing overlapping of AIDs between different STAs may occur.

The PPDU used by the S-AP for the multi-AP data transmission (MAP transmission) may include RU allocation information used by the receiving STA to transmit a BA frame. For example, the RU allocation information included in the PPDU used for the multi-AP data transmission (MAP transmission) transmitted by the S-AP may be the same as the RU allocation information included in the control frame received by the S-AP from the M-AP.

The S-AP may perform the multi-AP data transmission to one or more STAs. For example, the S-AP-1 may transmit data to the STA-a, and the S-AP-2 may transmit data to the STA-b. For example, the S-AP-1 may transmit data to the STA-a and the STA-b, and the S-AP-2 may transmit data to the STA-a. For example, the S-AP-1 may transmit data to the STA-b, and the S-AP-2 may transmit data to the STA-a and the STA-b. For example, the S-AP-1 may transmit data to the STA-a and the STA-b, and the S-AP-2 may transmit data to the STA-a and the STA-b.

The STA may receive a PPDU used for the multi-AP data transmission (MAP transmission) from the S-AP (S3510). That is, the STA may receive data from the S-AP. The STA may transmit a BA frame for the received data to the S-AP based on the RU allocation information included in the received PPDU (S3520).

For example, the STA may transmit the BA using the UL OFDMA scheme. The STA may transmit a BA frame based on the RU allocation information, and different RUs may be allocated to different STAs. For example, even if a plurality of STAs simultaneously transmit a BA frame, the plurality of STAs may transmit the BA frame through different time-frequency resources.

Since the S-AP knows the RU allocation information related to the BA frame to be transmitted by the receiving STA, the S-AP may receive the BA frame from the STA. The S-AP may know whether the STA has successfully received data based on the BA frame. For example, the S-AP may decode a BA frame received in the allocated RU, and may know whether the STA has successfully received data or failed to receive data based on the decoding result.

The S-AP may store information related to whether the STA has successfully received data (i.e., a value indicated by the BA frame). When the S-AP receives a BA request frame (e.g., a BAR frame) from the M-AP, the S-AP may transmit a BA frame including information related to whether the STA has successfully received data to the M-AP. For example, based on the first BA frame received from the STA-a and the second BA frame received from the STA-b, the S-AP may transmit a third BA frame related to whether the STA-a and the STA-b have received data, the M-AP.

Some of the detailed steps shown in the example of FIGS. 33 to 35 may be omitted, and other steps may be added. For example, in FIG. 33, receiving the BAR frame (S3340) and/or transmitting the BA frame (S3350) may be omitted. For example, in FIG. 33, performing capability negotiation with the M-AP before the step of receiving the control frame (S3310) may be added.

The technical features of the present specification described above may be applied to various devices and methods. For example, the above-described technical features of the present specification may be performed/supported through the apparatus of FIGS. 1 and/or 19. For example, the technical features of the present specification described above may be applied only to a part of FIGS. 1 and/or 19. For example, the technical features of the present specification described above are implemented based on the processing chips 114 and 124 of FIG. 1, or implemented based on the processors 111 and 121 and the memories 112 and 122 of FIG. 1, or, may be implemented based on the processor 610 and the memory 620 of FIG. 19. For example, an apparatus herein may include a memory and a processor operatively coupled to the memory, wherein the processor is configured for: obtaining a trigger frame from a second type AP, wherein the trigger frame includes first information related to resource allocation for a first block acknowledgment (BA) frame transmitted by a station (STA) to a first type AP; transmitting a physical protocol data unit (PPDU) including data for the STA and the first information to the STA; and receiving the first BA frame based on the first information from the STA.

The technical features of the present specification may be implemented based on a CRM (computer readable medium). For example, the CRM proposed by the present specification can be read by at least one computer including an instruction based on being executed by at least one processor of a first type access point (AP). The computer readable medium stores instructions that perform operations comprising: receiving a trigger frame from a second type AP, wherein the trigger frame includes first information related to resource allocation for a first block acknowledgment (BA) frame transmitted by a station (STA) to the first type AP; transmitting a physical protocol data unit (PPDU) including data for the STA and the first information to the STA; and receiving the first BA frame based on the first information from the STA. The instructions stored in the CRM of the present specification may be executed by at least one processor. At least one processor related to CRM in the present specification may be the processors 111 and 121 or the processing chips 114 and 124 of FIG. 1, or the processor 610 of FIG. 19. Meanwhile, the CRM of the present specification may be the memories 112 and 122 of FIG. 1, the memory 620 of FIG. 19, or a separate external memory/storage medium/disk.

When the embodiment is implemented in software, the above-described technique may be implemented as a module (process, function, etc.) that performs the above-described function. A module may be stored in a memory and executed by a processor. The memory may be internal or external to the processor, and may be coupled to the processor by various well-known means.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a first type AP in a wireless local area network (WLAN) system including a plurality of types of access points (APs), the method comprising:
    receiving, by the first type AP, a trigger frame from a second type AP, wherein the trigger frame includes first information related to resource allocation for a first block acknowledgment (BA) frame transmitted by a station (STA) to the first type AP;
    transmitting, by the first type AP, a physical protocol data unit (PPDU) including data for the STA and the first information to the STA; and
    receiving, by the first type AP, the first BA frame based on the first information from the STA.

2. The method of claim 1, wherein the trigger frame includes second information related to a transmission method to be used by the second type AP.

3. The method of claim 2, wherein the second information includes at least one of distributed multiple-input multiple-output (MIMO), coordinated-orthogonal frequency division multiple access (C-OFDMA), coordinated beam forming, and/or coordinated spatial reuse.

4. The method of claim 1, wherein trigger frame includes third information for a second BA frame transmitted by the first type AP to the second type AP, further comprising:
    receiving, by the first type AP, a BA request (BAR) frame from the second type AP; and
    transmitting, by the first type AP, the second BA frame to the second type AP based on the third information.

5. The method of claim 1, wherein the PPDU includes fourth information related to an identifier of the STA, and wherein the fourth information includes an association identifier (AID) of the STA and a BSSID related to the STA.

6. The method of claim 1, wherein the PPDU includes fourth information related to an identifier of the STA, and wherein the fourth information includes an identifier (ID) generated based on an association identifier (AID) of the STA and a BSSID related to the STA.

7. The method of claim 1, further comprising:
    receiving, by the first type AP, a BA request frame from the second type AP; and
    transmitting, by the first type AP, a second BA frame to the second type AP based on the first BA frame.

8. A first type access point (AP) in a wireless local area network (WLAN) system including a plurality of types of access points (APs), the first type PA comprising:
    a transceiver configured to transmit and/or receive a wireless signal; and
    a processor operatively coupled to the transceiver,
    wherein the processor is configured for:
        receiving a trigger frame from a second type AP, wherein the trigger frame includes first information related to resource allocation for a first block acknowledgment (BA) frame transmitted by a station (STA) to the first type AP;
        transmitting a physical protocol data unit (PPDU) including data for the STA and the first information to the STA; and
        receiving the first BA frame based on the first information from the STA.

9. The first type AP of claim 8, wherein the trigger frame includes second information related to a transmission method to be used by the second type AP.

10. The first type AP of claim 9, wherein the second information includes at least one of distributed multiple-input multiple-output (MIMO), coordinated -orthogonal frequency division multiple access (C-OFDMA), coordinated beam forming, and/or coordinated spatial reuse.

11. The first type AP of claim 8, wherein trigger frame includes third information for a second BA frame transmitted by the first type AP to the second type AP,
    wherein the processor is further configured for:
        receiving, by the first type AP, a BA request (BAR) frame from the second type AP; and
        transmitting, by the first type AP, the second BA frame to the second type AP based on the third information.

12. The first type AP of claim 8, wherein the PPDU includes fourth information related to an identifier of the STA, and wherein the fourth information includes an association identifier (AID) of the STA and a BSSID related to the STA.

13. The first type AP of claim 8, wherein the PPDU includes fourth information related to an identifier of the STA, and wherein the fourth information includes an identifier (ID) generated based on an association identifier (AID) of the STA and a BSSID related to the STA.

14. The first type AP of claim 8, wherein the processor is further configured for:
    receiving a BA request frame from the second type AP; and
    transmitting a second BA frame to the second type AP based on the first BA frame.

* * * * *